(12) United States Patent
Teyeb et al.

(10) Patent No.: US 11,778,524 B2
(45) Date of Patent: *Oct. 3, 2023

(54) NODE AND METHOD FOR ENABLING A WIRELESS TERMINAL TO BE SERVED BY MULTIPLE CELLS IN A COMMUNICATIONS NETWORK

(71) Applicant: Telefonaktiebolaget LM Ericsson (publ), Stockholm (SE)

(72) Inventors: Oumer Teyeb, Solna (SE); Angelo Centonza, Winchester (GB); Fredrik Gunnarsson, Linköping (SE); Niklas Johansson, Sollentuna (SE); Stefan Wager, Espoo (FI); Pontus Wallentin, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

This patent is subject to a terminal disclaimer.

(21) Appl. No.: 17/381,642

(22) Filed: Jul. 21, 2021

(65) Prior Publication Data

US 2021/0352541 A1 Nov. 11, 2021

Related U.S. Application Data

(63) Continuation of application No. 14/006,882, filed as application No. PCT/SE2013/050912 on Jul. 17, 2013, now Pat. No. 11,140,587.

(Continued)

(51) Int. Cl.
*H04W 36/00* (2009.01)
*H04W 36/24* (2009.01)
(Continued)

(52) U.S. Cl.
CPC ... *H04W 36/0069* (2018.08); *H04W 36/0072* (2013.01); *H04W 36/24* (2013.01);
(Continued)

(58) Field of Classification Search
CPC ......... H04W 36/0069; H04W 36/0072; H04W 36/24; H04W 36/0027; H04W 36/04; H04W 36/28; H04W 36/0055
(Continued)

(56) References Cited

U.S. PATENT DOCUMENTS 6,668,175 B1   12/2003  Almgren et al.
2009/0170426 A1  7/2009  Jung et al.
(Continued)

FOREIGN PATENT DOCUMENTS

CN   101772102 A   7/2010
CN   101820656 A   9/2010
(Continued)

OTHER PUBLICATIONS

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 3GPP TS 29.274 V11.3.0, Jun. 2012, pp. 1-219.

(Continued)

*Primary Examiner* — Kwang B Yao
*Assistant Examiner* — Syed M Bokhari
(74) *Attorney, Agent, or Firm* — Murphy, Bilak & Homiller, PLLC

(57) ABSTRACT

Example embodiments presented herein are directed towards a wireless terminal and base station, and corresponding methods therein, for providing a handover for a subset of bearers associated with the wireless terminal. The subset of bearers is less than a total number of bearers (Continued)

associated with the wireless terminal. Thus, upon the completion of the handover procedure, at least one bearer will stay connected with a source base station.

9 Claims, 16 Drawing Sheets

Related U.S. Application Data

(60) Provisional application No. 61/678,772, filed on Aug. 2, 2012.

(51) Int. Cl.
*H04W 36/28* (2009.01)
*H04W 36/04* (2009.01)

(52) U.S. Cl.
CPC ........ *H04W 36/0027* (2013.01); *H04W 36/04* (2013.01); *H04W 36/28* (2013.01)

(58) Field of Classification Search
USPC .......................................................... 370/331
See application file for complete search history.

(56) References Cited

U.S. PATENT DOCUMENTS

| | | |
|---|---|---|
| 2009/0186613 A1 | 7/2009 | Ahn et al. |
| 2009/0201884 A1* | 8/2009 | Chaponniere ......... H04W 92/20 370/332 |
| 2009/0225723 A1 | 9/2009 | Tenneti et al. |
| 2010/0062774 A1 | 3/2010 | Motegi et al. |
| 2010/0118781 A1* | 5/2010 | Petrovic ................ H04L 1/1887 370/328 |
| 2010/0128697 A1 | 5/2010 | Choi-Grogan |
| 2010/0157944 A1 | 6/2010 | Horn |
| 2010/0265912 A1 | 10/2010 | Mildh et al. |
| 2010/0303039 A1 | 12/2010 | Zhang et al. |
| 2010/0304682 A1 | 12/2010 | Choi et al. |
| 2011/0014920 A1 | 1/2011 | Nylander et al. |
| 2011/0086639 A1 | 4/2011 | Kalervo Hamalainen et al. |
| 2011/0113299 A1 | 5/2011 | Power et al. |
| 2011/0158121 A1 | 6/2011 | Casati et al. |
| 2011/0194462 A1* | 8/2011 | Wu .................... H04W 36/0088 370/259 |
| 2011/0207456 A1 | 8/2011 | Radulescu et al. |
| 2011/0268007 A1 | 11/2011 | Barany et al. |
| 2011/0274087 A1 | 11/2011 | Liang et al. |
| 2012/0039260 A1* | 2/2012 | Song ................ H04W 36/0033 370/328 |
| 2012/0076121 A1 | 3/2012 | Choi et al. |
| 2012/0088505 A1 | 4/2012 | Toh et al. |
| 2012/0100858 A1 | 4/2012 | Qin |
| 2012/0106388 A1 | 5/2012 | Shimezawa et al. |
| 2012/0108240 A1* | 5/2012 | Liu .................... H04W 36/0033 455/436 |
| 2012/0163336 A1 | 6/2012 | Adjakple et al. |
| 2012/0165013 A1 | 6/2012 | Nishida et al. |
| 2012/0182912 A1 | 7/2012 | Watfa et al. |
| 2012/0282932 A1* | 11/2012 | Yu ....................... H04W 84/005 455/437 |
| 2013/0070731 A1 | 3/2013 | Lim et al. |
| 2013/0107863 A1 | 5/2013 | Faccin et al. |
| 2013/0143574 A1 | 6/2013 | Teyeb et al. |
| 2013/0170474 A1* | 7/2013 | Bi ........................ H04W 72/23 370/332 |
| 2013/0176853 A1 | 7/2013 | Mahr |
| 2013/0201904 A1 | 8/2013 | Toskala et al. |
| 2013/0260811 A1 | 10/2013 | Rayavarapu |
| 2013/0272268 A1 | 10/2013 | Xu et al. |
| 2013/0301610 A1* | 11/2013 | Ali ........................ H04W 40/36 370/331 |
| 2013/0322325 A1 | 12/2013 | Hahn et al. |
| 2013/0337812 A1 | 12/2013 | Pekonen et al. |
| 2014/0045504 A1 | 2/2014 | Jung et al. |
| 2014/0211619 A1 | 7/2014 | Suryavanshi et al. |
| 2014/0213264 A1 | 7/2014 | Park et al. |
| 2014/0219248 A1 | 8/2014 | Reddiboyana et al. |
| 2014/0357274 A1 | 12/2014 | Teng et al. |

FOREIGN PATENT DOCUMENTS

| | | |
|---|---|---|
| CN | 101932057 A | 12/2010 |
| EP | 3367726 A1 | 8/2018 |
| RU | 2428817 C2 | 9/2011 |
| WO | 2010003501 A2 | 1/2010 |
| WO | 2011120559 A1 | 10/2011 |
| WO | 2011160059 A1 | 12/2011 |
| WO | 2012008739 A3 | 1/2012 |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.2.0, Jun. 2011, pp. 1-253.

Luo, Wantuan , et al., "A CoMP soft handover scheme for LTE systems in high speed railway", Luo, W., et al., "A CoMP soft handover scheme for LTE systems in high speed railway," EURASIP Journal on Wireless Communications and Networking 2012. Jun. 13, 2012. pp. 1-5.

* cited by examiner

NODE AND METHOD FOR ENABLING A WIRELESS TERMINAL TO BE SERVED BY MULTIPLE CELLS IN A COMMUNICATIONS NETWORK

RELATED APPLICATIONS

This application is a continuation of U.S. application Ser. No. 14/006,882 filed 23 Sep. 2013, which is a U.S. National Phase Application of PCT/SE2013/050912 filed 17 Jul. 2013, which claims benefit of U.S. Provisional Application No. 61/678,772 filed 2 Aug. 2012. The entire contents of each aforementioned application is incorporated herein by reference.

TECHNICAL FIELD

Example embodiments presented herein are directed towards a wireless terminal and base station, and corresponding methods therein, for providing a handover for a subset of bearers associated with the wireless terminal.

BACKGROUND

With the proliferation of user friendly smart phones and tablets, the usage of high data rate services such as video streaming over the mobile network is becoming common place, greatly increasing the amount of traffic in mobile networks. Thus, there is a great urgency in the mobile network community to ensure that the capacity of mobile networks keep increasing along with the ever-increasing user demand. The latest systems such as Long Term Evolution (LTE), especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use Heterogeneous Networks where the traditional pre-planned macro base stations (known as the macro layer) are complemented with several low-powered base stations that may be deployed in a relatively unplanned manner. The 3rd Generation Partnership Project (3GPP) has incorporated the concept of Heterogeneous Networks as one of the core items of study in the latest enhancements of LTE, such as LTE release 11 and several low-powered base stations for realizing heterogeneous networks such as pico base stations, femto base stations (also known as home base stations or HeNBs), relays, and RRHs (remote radio heads) have been defined. The initial discussion for LTE release 12 has already started and one of the proposed items for study is the possibility of serving a user equipment (UE) from more than one eNB simultaneously. The current legacy handover mechanisms of LTE have to be updated in order to support this.

FIG. 1 provides an example of a heterogeneous network where a mobile terminal 101 uses multiple flows, e.g. an anchor flow from the macro base station (or "anchor eNB") 401A and a assisting flow from a pico base station (or a "assisting eNB") 401B. One of the problems in using a heterogeneous network is how to map the user plane bearers on the anchor flow and assisting flow, respectively. The simple solution is that each bearer is mapped on a single flow, for example, the first bearer uses the anchor flow and the second bearer uses the assisting flow.

SUMMARY

When using a single flow for mapping bearers in a heterogeneous network, several problems exist. An example of such a problem is the need for frequent handovers. In order to keep the user data throughput on acceptable levels, the user plane bearer may need to be "handed over" frequently from the assisting flow to the anchor flow or vice versa, depending on radio link conditions and the speed of the mobile terminal. Furthermore, each handover introduces signaling between the network and the mobile terminal and also within the network. With many mobile terminals and pico base stations, the signaling load in the network nodes may become considerate and possibly a limiting factor.

Thus, at least one example object of some of the example embodiments presented herein is to provide different mechanisms for enabling multiple connectivity between a user equipment and multiple cells. Different selective handover and related bearer management and measurement configuration procedures are described herein. The basic concept of a selective handover as well as the required changes to the communication of base stations involved in the selective handover is also described herein. The main focus of the example embodiments described herein is the communication aspects between the base station and the user equipment. The example embodiments presented herein make it possible to perform handovers selectively between a source and a target base station, thereby creating more system flexibility than the legacy way of performing handovers where a user equipment is completely handed over to the target (i.e., all bearers associated with the user equipment are handed over).

An example advantage of some of the example embodiments presented herein is the possibility to keep all the user equipment bearers ongoing as the bearers that the target was not able to admit may be kept at the source. A further example advantage is the possibility to trigger handover at a bearer level rather than at a user equipment level. For example, the source base station may keep the bearers that are unable to tolerate discontinuity such as VoIP services with itself until the radio conditions of the source are at much lower quality than the target. Meanwhile, bearers that are very capacity hungry but more tolerant to interruptions such as file download may be handed over to the target even if the radio conditions at the source are not that bad.

Another example advantage is the possibility to maintain control plane at one base station, while sharing the data load at several base stations. This opens several opportunities such as network sharing. For example, several operators may share the pico nodes for data bearers, while maintaining the signaling radio bearers only at their macros. A further example advantage is providing control plane diversity, such as the sending of handover command from the source and/or target base station or the sending of the measurement report towards target becomes rather straightforward with multiple connectivity. Yet a further example advantage is that the RLF on the assisting or anchor node may be recovered faster. Assister recovery is straightforward as the user equipment context resides at the anchor, and anchor recovery also becomes fast as the assisting node may fetch the context easily from the network.

Some of the example embodiments are directed towards a method, in a wireless terminal, for a handover of a sub-set of bearers associated with the wireless terminal. The sub-set of bearers is less than all bearers associated with the wireless terminal. The method comprises receiving, from a source or a target base station, a message. The message indicates that a handover procedure will take place for an identified sub-set of bearers. The method further comprises handing over the identified sub-set of bearers to the target base station, wherein at least one bearer associated with the wireless terminal, which is not part of the identified sub-set of bearers, remains connected to the source base station.

Some of the example embodiments are directed towards a wireless terminal for a handover of a sub-set of bearers associated with the wireless terminal. The sub-set of bearers is less than all bearers associated with the wireless terminal. The wireless terminal comprises radio circuitry configured to receive, from a source or a target base station, a message. The message indicates that a handover procedure will take place for an identified sub-set of bearers. The wireless terminal further comprises processing circuitry configured to hand over the identified sub-set of bearers to the target base station, wherein at least one bearer associated with the wireless terminal, which is not part of the identified sub-set of bearers, remains connected to the source base station.

Some of the example embodiments are directed towards a method, in a base station, for providing a handover of at least a sub-set of bearers associated with a wireless terminal. The sub-set of bearers is less than all bearers associated with the wireless terminal. The method comprises determining a need for a handover procedure. The method also comprises selecting the sub-set of bearers associated with the wireless terminal for the handover procedure. The method further comprises sending, to the wireless terminal, a message indicating a handover procedure for the sub-set of bearers.

Some of the example embodiments are directed towards a base station for providing a handover of at least a sub-set of bearers associated with a wireless terminal. The sub-set of bearers is less than all bearers associated with the wireless terminal. The base station comprises processing circuitry configured to determine a need for a handover procedure. The processing circuitry is further configured to select the sub-set of bearers associated with the wireless terminal for the handover procedure. The base station further comprises radio circuitry configured to send, to the wireless terminal, a message indicating a handover procedure for the sub-set of bearers.

Definitions

3GPP 3rd Generation Partnership Project
AMBR Aggregate Maximum Bit Rate
AP Application Protocol
APN Access Point Name
ARP Allocation and Retention Priority
ARQ Automatic Repeat reQuest
BCH Broadcast Channel
CIO Cell Individual Offset
CN Core Network
CRS Cell specific Reference Symbol
CSG Closed Subscriber Group
DL Downlink
DM Demodulation
DRB Data Radio Bearer
E-RAB E-UTRAN Radio Access Bearers
E-UTRA Evolved Universal Terrestrial Radio Access
E-UTRAN Evolved UMTS Terrestrial Radio Access Network
eNB/eNodeB enhanced Node B (base station)
EPC Evolved Packet Core
EPS Evolved Packet System
EMM Evolved Packet System Connection Management
GBR Guaranteed Bit Rate
GUMMEI Globally Unique Mobility Management Entity Identifier
HARQ Hybrid Automatic Repeat reQuest
HeNB Home eNB
HO Handover
HOM Handover Margin
HSPA High-Speed Packet Access
IE Information Element
ID Identity
IP Internet Protocol
LTE Long Term Evolution
MAC Medium Access Control
MBR Maximum Bit Rate
MME Mobility Management Entity
MTCP Multi-path Transmission Control Protocol
NAS Non-Access Stratum
OAM Operation and Maintenance
PGW PDN Gateway
PBCH Physical Broadcast CHannel
PCell Primary Cell
PCFICH Physical Control Format Indicator CHannel
PCI Physical Cell Identity
PDCCH Physical Downlink Control CHannel
PDCP Packet Data Convergence Protocol
PDN Packet Data Network
PDSCH Physical Downlink Shared CHannel
PDU Packet Data Unit
PHICH Physical Hybrid ARQ Indicator CHannel
PSS Primary Synchronization Signal
QCI QoS Class Identifier
QoS Quality of Service
RLC Radio Link Control
RAB Radio Access Bearer
RAT Radio Access Technology
RE Resource Element
RLC Radio Link Control
RLF Radio Link Failure
RRC Radio Resource Control
RRH Remote Radio Head
RRM Radio Resource Management
RS Reference Signal
RSCP Received Signal Code Power
RSRP Reference Signal Received Power
RSRQ Reference Signal Received Quality
Rx Receive
SGW Serving Gateway
SCell Secondary Cell
SCTP Stream Control Transmission Protocol
SDF Service Data Flow
SDU Service Data Unit
SFN System Frame Number
SINR Signal to Interference plus Noise Ratio
SRB Signaling Radio Bearer
SRVCC Single Radio Voice Call Continuity
SSS Secondary Synchronization Signal
TCP Transmission Control Protocol
TTT Time To Trigger
Tx Transmit
UE User Equipment
UL Uplink
UMTS Universal Mobile Telecommunications System
UTRA Universal Terrestrial Radio Access
UTRAN Universal Terrestrial Radio Access Network
VoIP Voice over Internet Protocol

BRIEF DESCRIPTION OF THE DRAWINGS

The foregoing will be described in more detail with from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments.

General Overview

Figure 1:
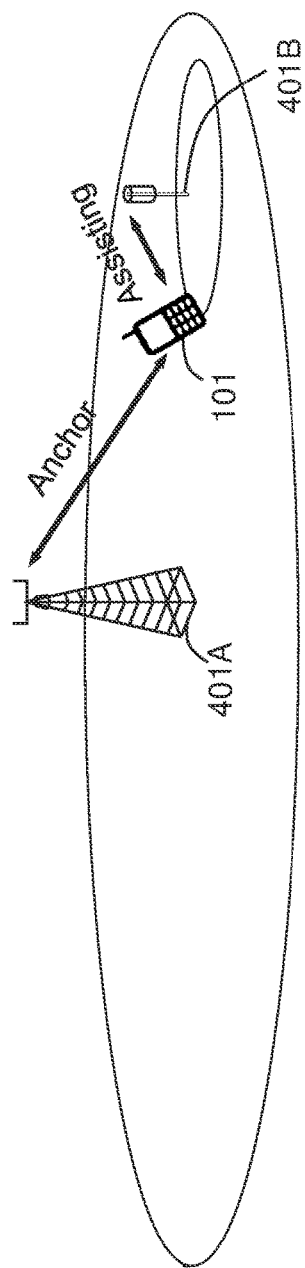
FIG. 1 is an illustrative example of a heterogeneous deployment with simultaneous anchor and assisting flows to a wireless terminal.
Figure 2:
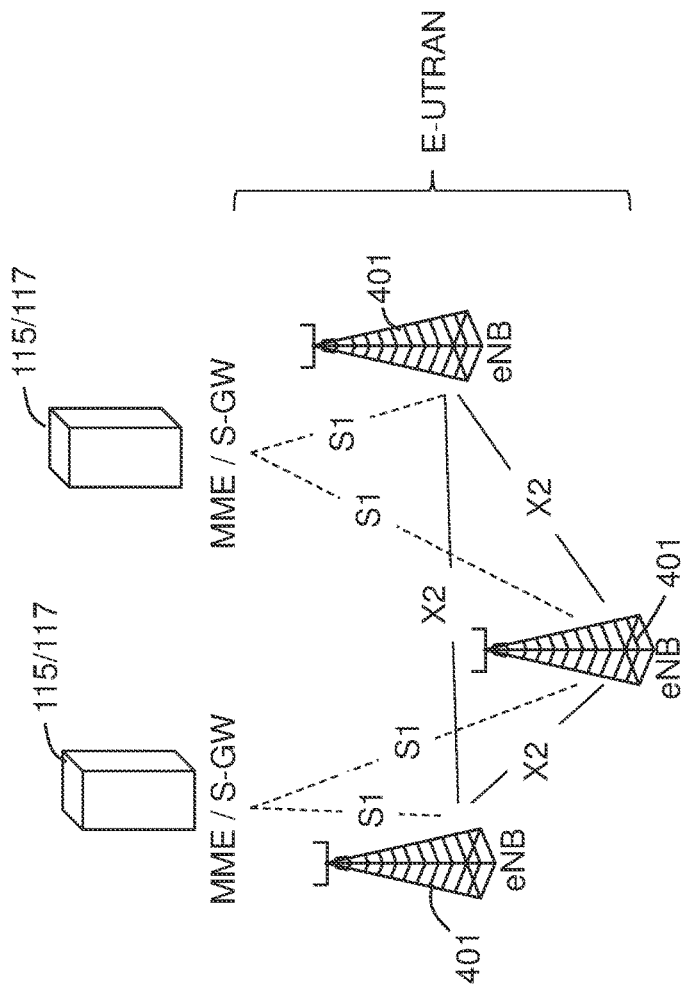
FIG. 2 is an illustrative example of E-UTRAN architecture.

In order to better explain the example embodiments presented herein, a problem will first be identified and discussed. The Evolved UMTS Terrestrial Radio Access Network (E-UTRAN) comprise base stations 401 called enhanced NodeBs (eNBs or eNodeBs), providing the E-UTRA user plane and control plane protocol terminations towards the user equipment. The base stations or eNBs 401 are interconnected with each other by means of the X2 interface. The eNBs 401 are also connected by means of the S1 interface to the EPC (Evolved Packet Core), more specifically to the MME (Mobility Management Entity) 115 by means of the S1-MME interface and to the Serving Gateway (SGW) 117 by means of the S1-U interface. The S1 interface supports many-to-many relation between MMEs/SGWs and eNBs. The E-UTRAN architecture is illustrated in FIG. 2.

The eNB 401 hosts functionalities such as Radio Resource Management (RRM), radio bearer control, admission control, header compression of user plane data towards serving gateway, routing of user plane data towards the serving gateway. The MME 115 is the control node that processes the signaling between the user equipment and the CN. The main functions of the MME 115 are related to connection management and bearer management, which are handled via Non Access Stratum (NAS) protocols. The SGW 117 is the anchor point for user equipment mobility, and also comprises other functionalities such as temporary DL data buffering while the user equipment 101 is being paged, packet routing and forwarding the right eNB, gathering of information for charging and lawful interception. The PDN Gateway (PGW) 119 is the node responsible for user equipment IP address allocation, as well as Quality of Service (QoS) enforcement (this is explained further in later sections).

Figure 3:
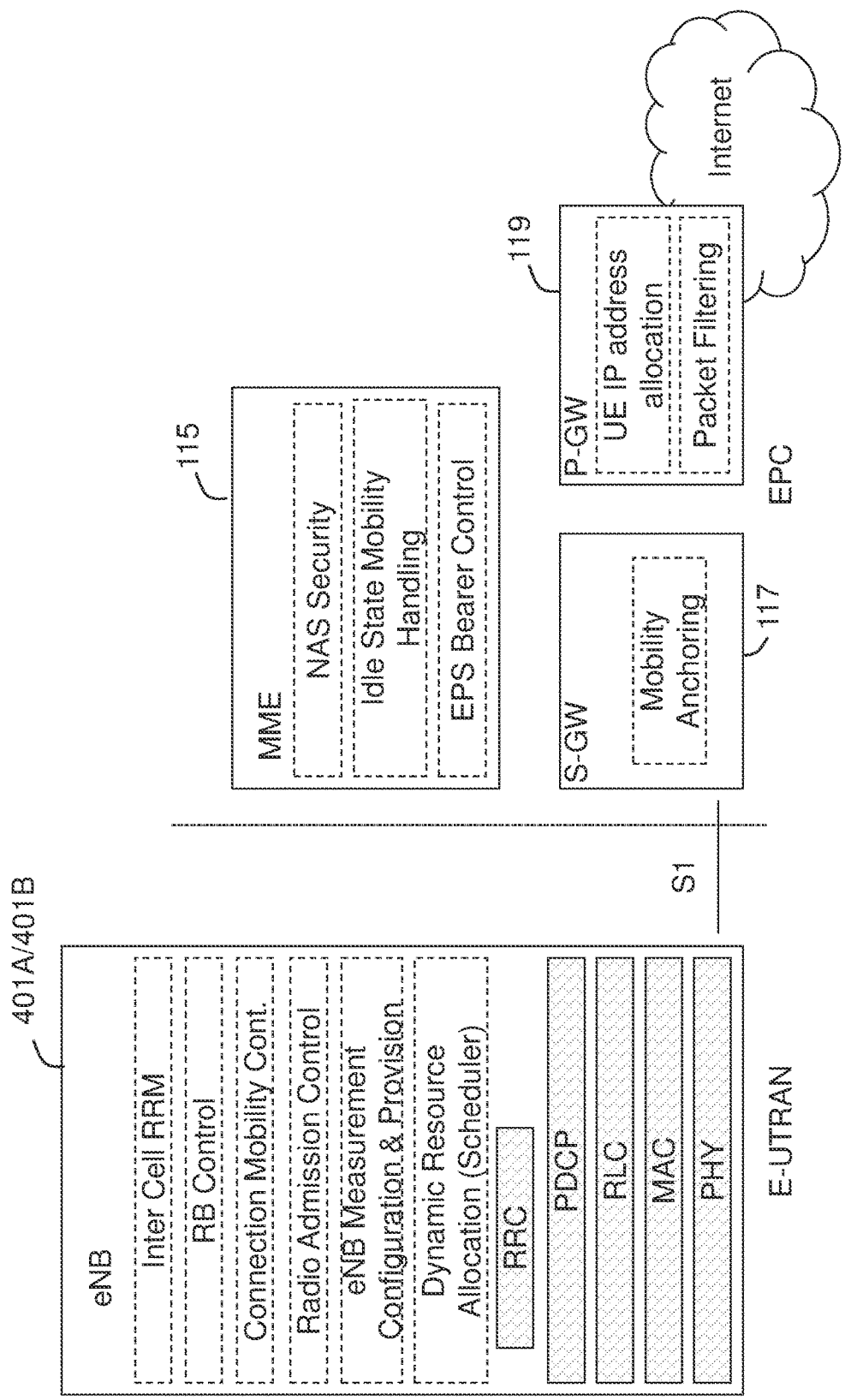
FIG. 3 is a schematic depicting the functional split between E-UTRAN and EPC.

FIG. 3 gives a summary of the functionalities of the different nodes, referred to in 3GPP TS 36.300 and the references therein providing the details of the functionalities of the different nodes. In FIG. 3, the solid lined boxes depict the logical nodes, dashed boxes depict the functional entities of the control plane and cross-hatched boxes depict the radio protocol layers.

Radio Protocol Architecture

Figure 4:
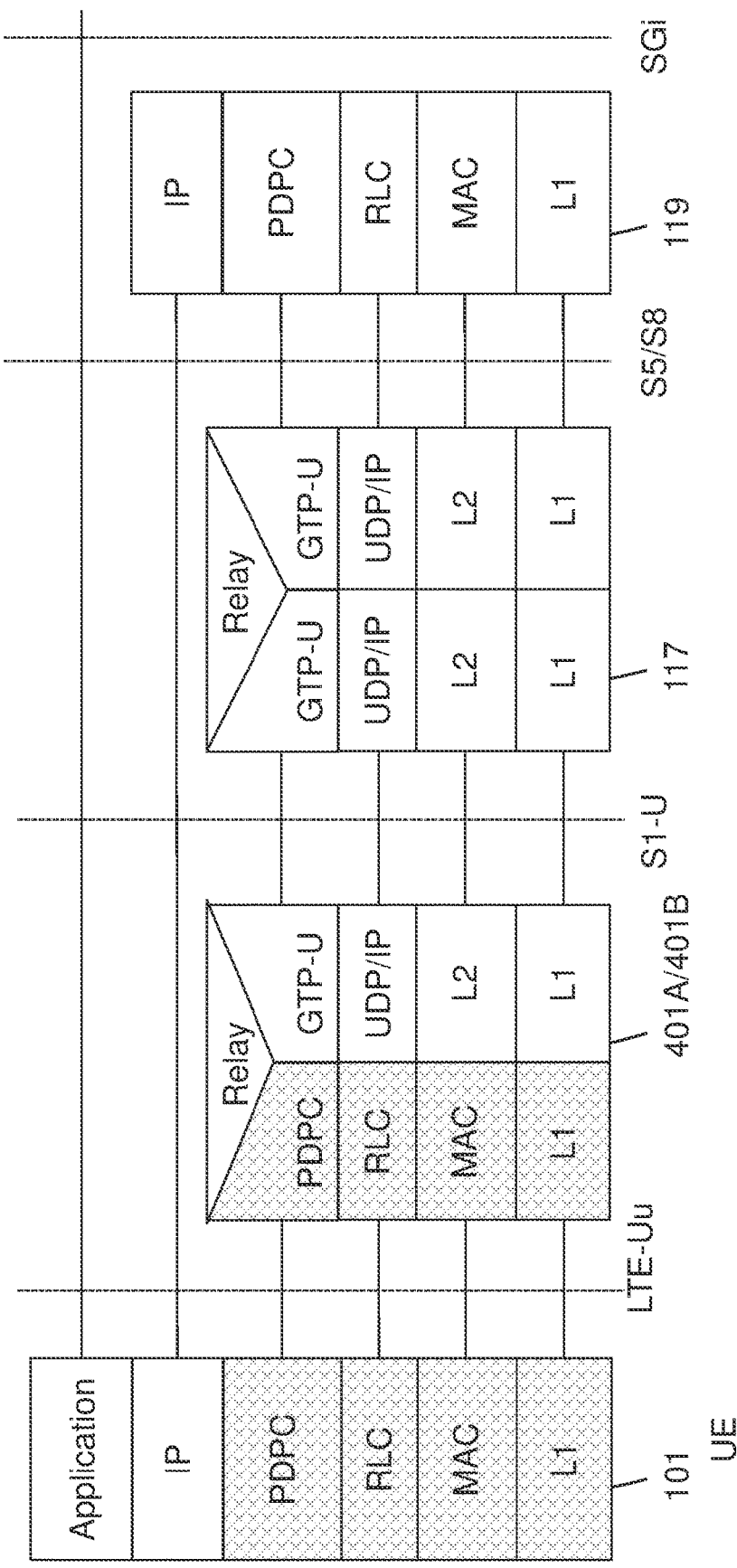
FIG. 4 is a user plane protocol stack.

The radio protocol architecture of E-UTRAN is divided into the user plane and the control plane. FIG. 4 shows the protocol stack for the user-plane. The user plane protocol stack is comprised of the Packet Data Convergence Protocol (PDCP), Radio Link Control (RLC), and Medium Access Control (MAC), which are terminated at the eNB 401. The PDCP manages IP packets in the user plane and it performs functionalities such as header compression, security, and re-ordering and retransmission during handover. The RLC layer is mainly responsible for segmentation (and corresponding assembly) of PDCP packets, in order that they fit the size that is actually to be transmitted over the air interface. RLC can operate either in unacknowledged mode or acknowledged mode, where the latter supports retransmissions. The MAC layer performs multiplexing of data from different radio bearers, and it is the one that informs the RLC about the size of the packets to provide, which is decided based on the required QoS of each radio bearer and the current capacity available to the user equipment 101.

Figure 5:
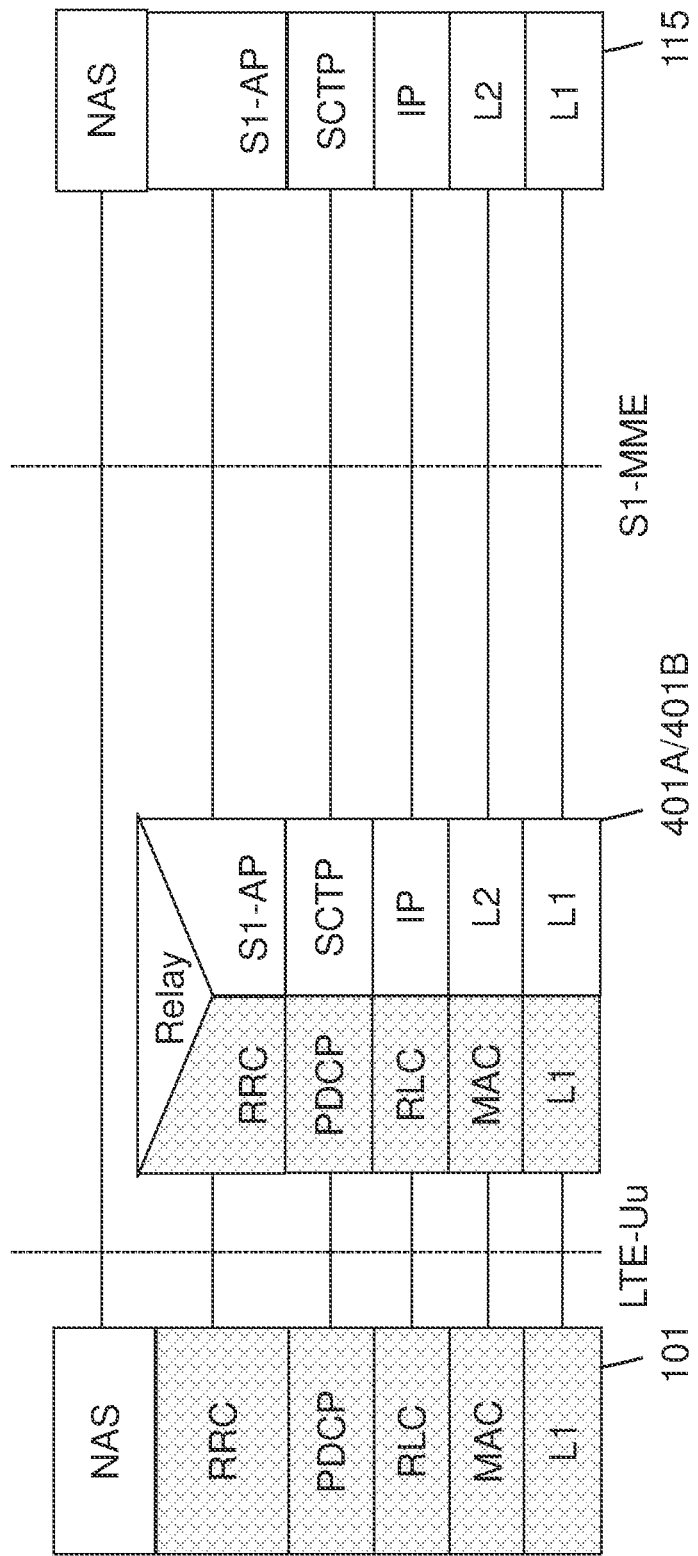
FIG. 5 is a control plane protocol stack.

FIG. 5 shows the control plane protocol stack. The layers below the Radio Resource Control (RRC) layer perform the same functionality as in the user plane except that there is no header compression in the control plane. The main functions of the RRC are the broadcasting of system information, RRC connection control (establishment, modification, and release of RRC connection, establishment of signaling radio bearers (SRB) and data radio bearers (DRBs), handover, configuration of lower protocol layers, radio link failure recovery, etc.), and measurement configuration and reporting. The details of the RRC protocol functionalities and procedures may be found in 3GPP TS 36.331.

A user equipment or wireless terminal 101 in general is uniquely identified over the S1 interface within an eNB 401 with the eNB UE S1 AP ID. When an MME 115 receives an eNB UE S1 AP ID it stores it for the duration of the user equipment associated logical S1-connection for this user equipment 101. Once known to an MME 115 this IE is comprised in all user equipment associated S1-AP signaling. The eNB UE S1 AP ID is unique within the eNB 401, and user equipments are assigned new S1AP ID after a handover by the target eNB.

From the MME side, a user equipment 101 is uniquely identified using the MME UE S1AP ID. When an eNB 401 receives an MME UE S1AP ID it stores it for the duration of the user equipment-associated logical S1 connection for this user equipment 101. Once known to an eNB 401 this IE is comprised in all user equipment associated S1-AP signaling. The MME UE S1AP ID is unique within the MME 115, and it is changed if the user equipment's MME changes, for example, handover between two eNBs connected to different MMEs.

Figure 6:
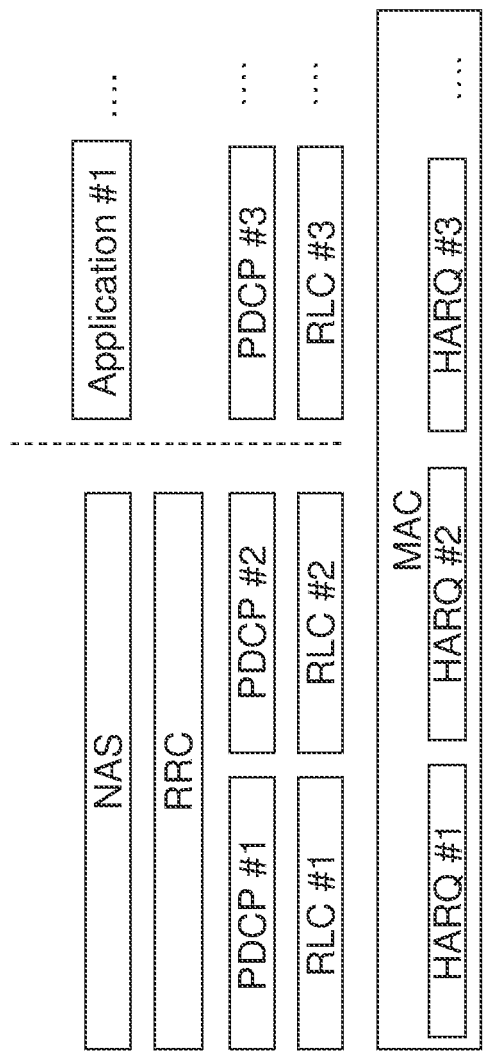
FIG. 6 is a user plane and control plane data flow.

The flow of user plane and control plane data is illustrated in FIG. 6. There is only one MAC entity per user equipment 101 (unless the user equipment supports multiple carriers as in the case of carrier aggregation) and under this MAC entity, several Hybrid ARQ (HARQ) processes might be running simultaneously for rapid retransmissions. There is a separate RLC entity for each radio bearer and if the radio bearer is configured to use PDCP, there is also one separate PDCP entity for that bearer. A bearer is configured to use PDCP only if it is dedicated to a user equipment (i.e., multicast and broadcast data do not utilize PDCP both in the control and user plane and the PDCP is used only for dedicated control message in the control plane and for dedicated UL/DL data in the user plane).

At the transmitting side each layer receives a Service Data Unit (SDU) from a higher layer, and sends a Protocol Data Unit (PDU) to the lower layer. For example, PDCP PDUs are sent towards the RLC, and they are RLC SDUs from RLC point of view, which in turn sends RLC PDUs towards the MAC, which are MAC SDUs from the MAC point of view. At the receiving end, the process is reversed, i.e. each layer passing SDUs to the layer above it, where they are perceived as PDUs.

Quality of Service

A user equipment 101 may have multiple applications running at the same time, each having different QoS requirements, for example. VoIP, browsing, file download, etc. In order to support these different requirements, different bearers are set up, each being associated with a QoS. An EPS bearer/E-RAB (Radio Access Bearer) is the level of granularity for bearer level QoS control in the EPC/E-UTRAN. That is, Service Data Flows (SDF) mapped to the same EPS bearer receive the same bearer level packet forwarding treatment (e.g., scheduling policy, queue management policy, rate shaping policy. RLC configuration, etc.).

One EPS bearer/E-RAB is established when the user equipment 101 connects to a PDN, and that remains established throughout the lifetime of the PDN connection to provide the user equipment 101 with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer may only be taken by the EPC, and the bearer level QoS parameter values are always assigned by the EPC.

An EPS bearer/E-RAB is referred to as a GBR bearer if dedicated network resources related to a Guaranteed Bit Rate (GBR) value that is associated with the EPS bearer/E-RAB are permanently allocated (e.g., by an admission control function in the eNB) at bearer establishment/modification. Otherwise, an EPS bearer/E-RAB is referred to as a Non-GBR bearer. A dedicated bearer may either be a GBR or a Non-GBR bearer while a default bearer shall be a Non-GBR bearer.

Figure 7:
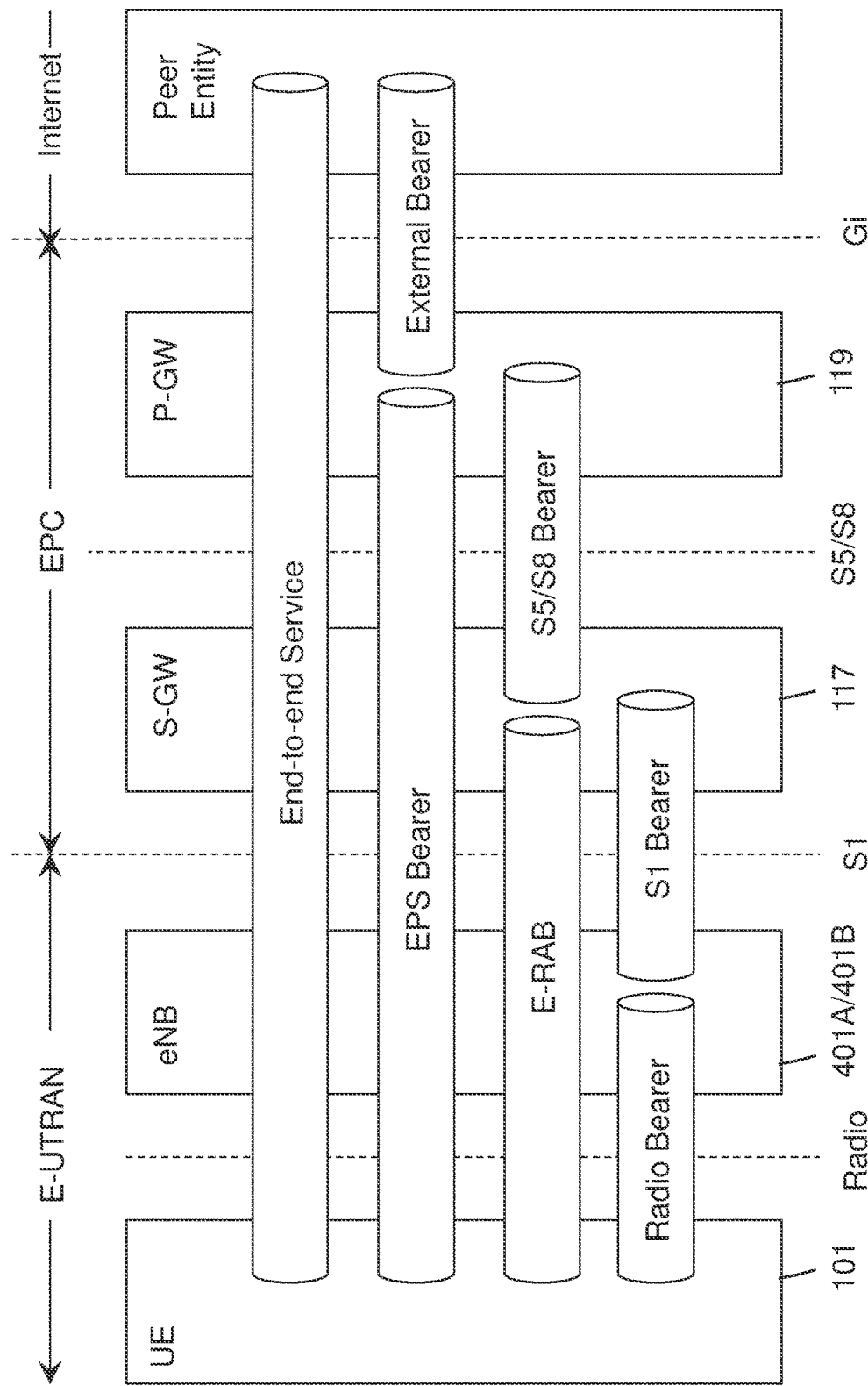
FIG. 7 is an illustrative example of bearer service architecture.

The EPS bearer service architecture is shown in FIG. 7. The packets of an EPS bearer are transported over a radio bearer between the user equipment 101 and eNB 401. An S1 bearer transports the packets of an EPS bearer between the eNB 401 and SGW 117. An E-RAB is actually a concatenation of these two bearers (i.e., radio bearer and S1 bearer), and the two bearers are mapped on a one to one fashion. An S5/S8 bearer transports the packets of the EPS bearer between the SGW 117 and PGW 119, and completes the EPS bearer. Here also there is a one to one mapping between the E-RAB and S5/S8 bearer.

The bearer level (i.e., per bearer or per bearer aggregate) QoS parameters are QCI, ARP, GBR, and AMBR. Each EPS bearer/E-RAB (GBR and Non-GBR) is associated with the following bearer level QoS parameters: QCI and ARP. QoS Class Identifier (QCI) is a scalar that is used as a reference to access node-specific parameters that control bearer level packet forwarding treatment (e.g., scheduling weights, admission thresholds, queue management thresholds, link layer protocol configuration, etc.), and that has been pre-configured by the operator owning the eNodeB 401. The QCI may also be used to reference node-specific parameters that control bearer level packet forwarding treatment in the other nodes in the user plain chain, for example, the PGW 119 and the SGW 117. Nine QCI values are standardized, the detailed requirements of these classes may be found in 3GPP TS 23.203. Allocation and Retention Priority (ARP) is used to decide whether a bearer establishment/modification request may be accepted or needs to be rejected in case of resource limitations. In addition, the ARP may be used by the eNodeB 401, SGW 117 or PGW 119 to decide which bearer(s) to drop during exceptional resource limitations (e.g., at handover).

Each GBR bearer is additionally associated with the bearer level QoS parameters GBR and MBR. Guaranteed Bit Rate (GBR) is the bit rate that may be expected to be provided by a GBR bearer. Maximum Bit Rate (MBR) is the maximum bit rate that may be expected to be provided by a GBR bearer. MBR can be greater or equal to the GBR.

Each APN access, by a user equipment 101, is associated with a per-APN Aggregate Maximum Bit Rate (APN-AMBR). The APN-AMBR sets the limit on the aggregate bit rate that may be expected to be provided across all Non GBR bearers and across all PDN connections of the same APN. Each user equipment 101 in state EMM-REGISTERED is associated with the bearer aggregate level QoS parameter known as per user equipment Aggregate Maximum Bit Rate (UE-AMBR). The UE AMBR limits the aggregate bit rate that may be expected to be provided across all Non GBR bearers of a user equipment 101.

Heterogeneous Networks and Soft/Shared Cells

Figure 8:
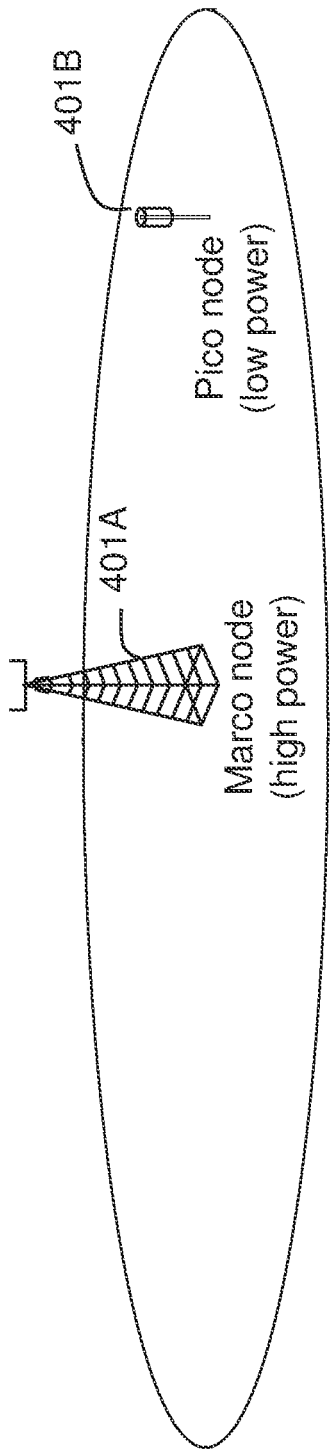
FIG. 8 is an illustrative example of a heterogeneous deployment with a higher-power macro node and a lower-power pico node.

The use of a so called heterogeneous deployment or heterogeneous network, as illustrated in FIG. 8, comprising network transmission nodes with different transmit power operating and with overlapping coverage areas, is considered to be an interesting deployment strategy for cellular networks. In such a deployment, the low-power nodes ("pico nodes"), which may be utilized as assisting base stations 401B, are typically assumed to offer high data rates (Mbit/s), as well as provide high capacity (users/m2 or Mbit/s/m2), in the local areas where this is needed/desired, while the high-power nodes ("macro nodes"), which may be utilized as anchor base stations 401A, are assumed to provide full-area coverage. In practice, the macro nodes 401A may correspond to currently deployed macro cells while the pico nodes 401B are later deployed nodes, extending the capacity and/or achievable data rates within the macro-cell coverage area where needed.

Figure 9:
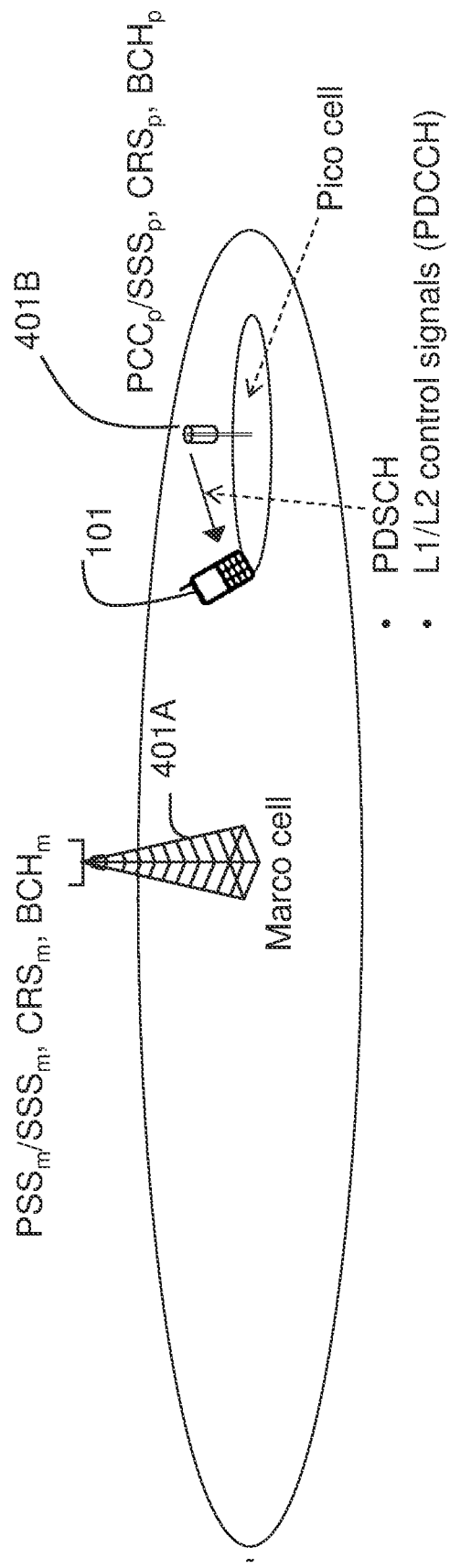
FIG. 9 is an illustrative example of a heterogeneous deployment where the pico node corresponds to a cell of its own.

A pico node 401B of a heterogeneous deployment may correspond to a cell of its own (a "pico cell"), as illustrated in FIG. 9. This means that, in addition to downlink and uplink data transmission/reception, the pico node also transmits the full set of common signals/channels associated with a cell. In the LTE context this comprises Primary and Secondary Synchronization Signals (PSS and SSS) corresponding to the Physical Cell Identity of the pico cell. Also comprised are Cell-specific reference signals (CRS), also corresponding to the Physical Cell Identity of the cell. The CRS may, for example, be used for downlink channel estimation to enable coherent demodulation of downlink transmissions. Further comprised is the Broadcast channel (BCH), with corresponding pico-cell system information.

As the pico node 401B transmits the common signals/channels, the corresponding pico cell may be detected and selected (e.g., connected to) by a terminal (UE, user equipment) 101. If the pico node 401B corresponds to a cell of its own, also so-called L1/L2 control signaling on the PDCCH (as well as PCFICH and PHICH) are transmitted from the pico node to connected terminals, in addition to downlink data transmission on the PDSCH. The L1/L2 control signaling, for example, provides downlink and uplink scheduling information and Hybrid-ARQ-related information to terminals within the cell. This is shown in FIG. 9.

Figure 10:
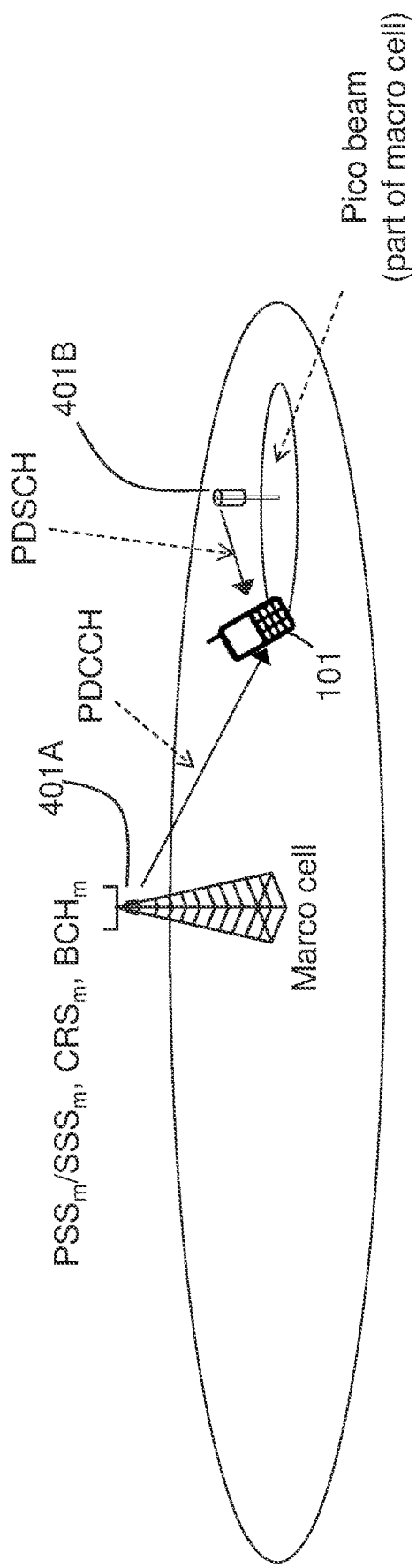
FIG. 10 is an illustrative example of a heterogeneous deployment where the pico node does not correspond to a cell of its own.

Alternatively, a pico node 401B within a heterogeneous deployment may not correspond to a cell of its own but may just provide a data-rate and capacity "extension" of the overlaid macro cell 401A. This is sometimes known as "shared cell" or "soft cell". In this case at least the CRS, PBCH, PSS and SSS are transmitted from the macro node 401A. The PDSCH may be transmitted from the pico node 401B. To allow for demodulation and detection of the PDSCH, despite the fact that no CRS is transmitted from the pico node 401B, DM-RS should be transmitted from the pico node 401B together with the PDSCH. The user equipment-specific reference signals may then be used by the terminal for PDSCH demodulation/detection. This is shown in FIG. 10.

Figure 11:
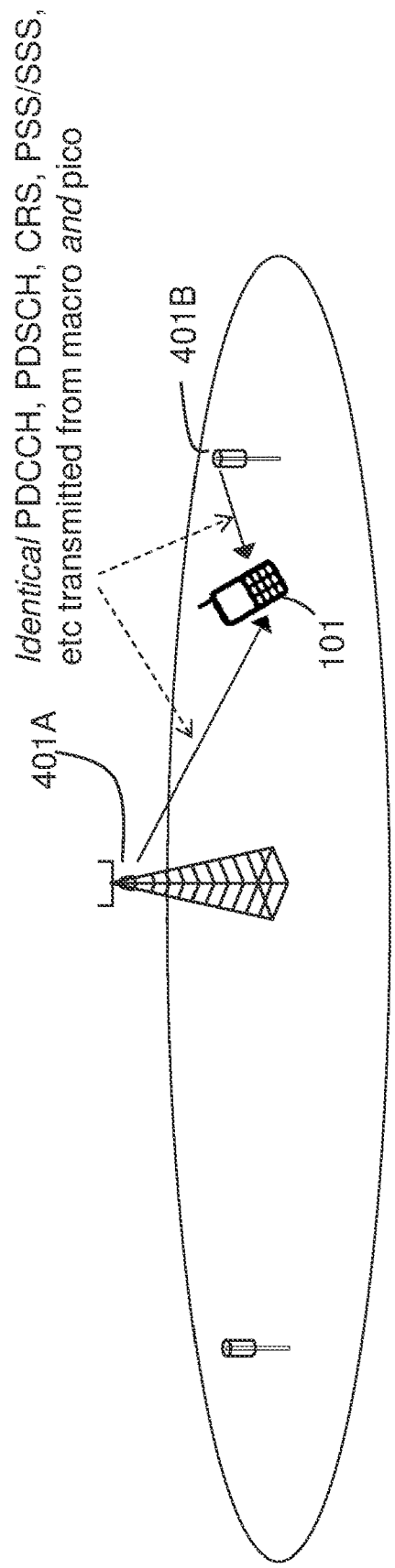
FIG. 11 is a depiction of SFN operation with identical transmission from macro and pico to a terminal.

Transmitting data from a pico node 401B not transmitting CRS as described above requires DM-RS support in the terminal ("non-legacy terminal"). In LTE. DM-RS-based PDSCH reception is supported in Rel-10 and for FDD while for the L1/L2 control signaling. DM-RS-based reception is planned for Rel-11. For terminals not supporting DM-RS-based reception ("legacy terminals") one possibility in a shared cell setting is to exploit $SFN^2$-type of transmission. In essence identical copies of the signals and channels necessary for a legacy terminal are transmitted simultaneously from the macro 401A and pico 401B nodes. From a terminal perspective this will look as a single transmission. Such an operation, which is illustrated in FIG. 11, will only provide an SINR gain. This may be translated into a higher data rate, but not a capacity improvement, as transmission resources cannot be reused across sites within the same cell.

Figure 12:
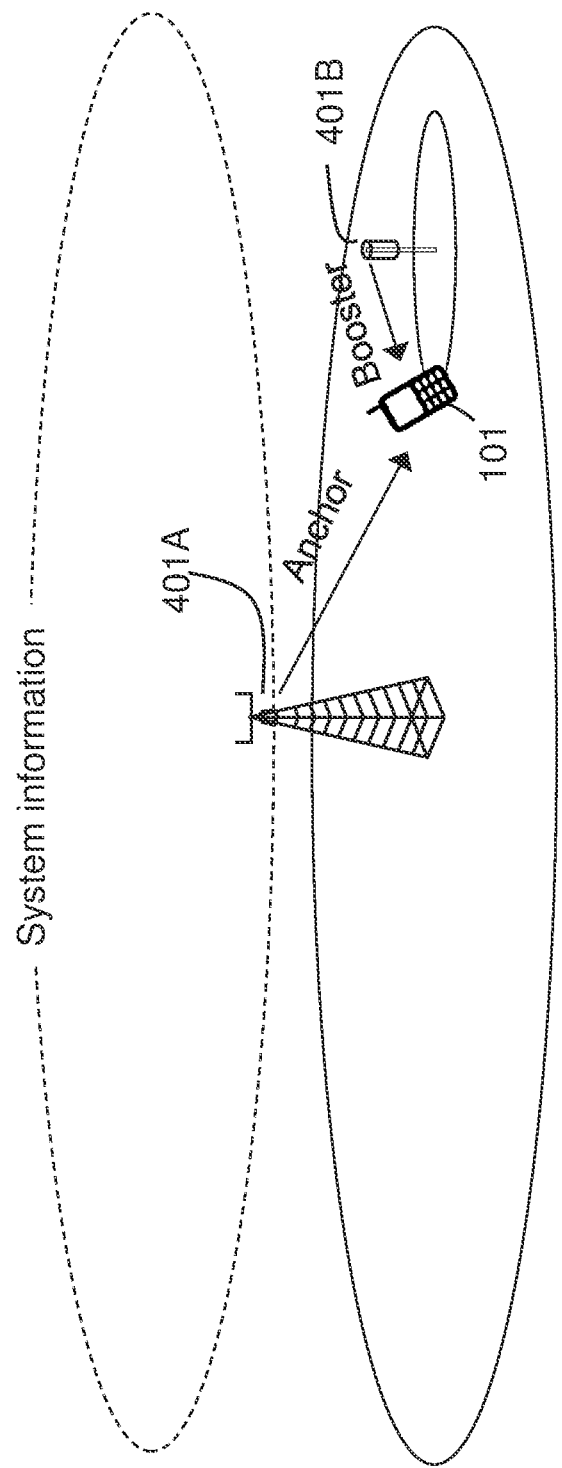
FIG. 12 is a depiction of soft cell operation with the wireless terminal having multiple connections with both the anchor and assisting base stations.

It may be assumed that the macros 401A are able to provide coverage and the picos 401B are there only for capacity enhancements (i.e., no coverage holes), another alternative architecture is where the user equipment maintains the macro connectivity all the time (called the "anchor" flow), and adds the pico connectivity when it is in the coverage area of the pico (called the "assisting" flow). When both connections are active, the anchor flow may be used either for control signaling while the assisting flow is used for data. However, it will still be possible to send data also via the anchor flow. We define this case as "multiple connectivity" or "dual connectivity". This is illustrated in FIG. 12. Note that in this case, as in the previous cases, the system information is shown to be sent only from the macro 401A, but it is still possible to send it also from the picos 401B.

Protocol Architecture for Soft Cells

Figure 13:
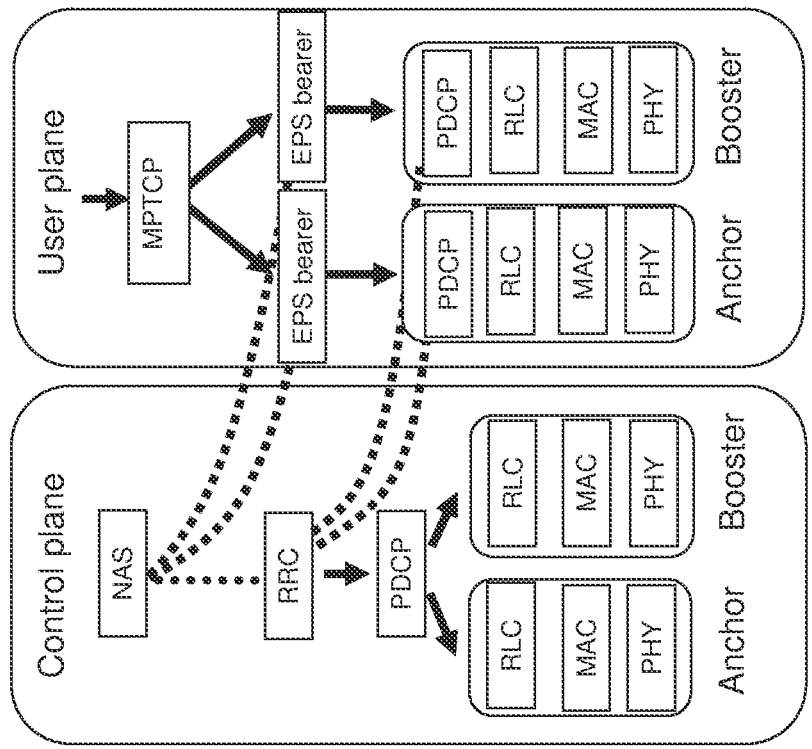
FIG. 13 is an illustrative example of protocol architecture for multiple or dual connectivity.

In order to support multiple connectivity, several architectural options are possible both for the control and user plane. For the user plane, we can have a centralized approach where the PDCP (or even the RLC) is terminated at the anchor only and the assisting node terminates at the RLC (or even the MAC) level. A decentralized approach will be to have the assisting node to terminate at the PDCP level. A similar approach may be taken in the control plane, for example, distributed or centralized PDCP/RLC, but on top of that we have the additional dimension of centralizing or distributing the RRC. FIG. 13 shows example control and user plane architectures, where the user plane is employing distributed PDCP, while the control plane is centralized at the PDCP level at the anchor. Note that in the figure, user plane aggregation, for example, the possibility to split the packets belonging to one application data flow over the anchor and assisting links, may be realized by using a higher layer aggregation protocol like multi-path TCP (MTCP).

User Equipment Measurements

User equipments may be configured to report measurements, mainly for the sake of supporting mobility. As specified in 3GPP TS 36.331, the E-UTRAN provides the measurement configuration applicable for a user equipment in RRC_CONNECTED by means of dedicated signaling, for example, using the RRCConnectionReconfiguration message.

Various measurement configurations may be signaled to the user equipment. An example of such a measurement configuration is measurement objects. Measurement objects define on what the user equipment should perform the measurements on, for example, a carrier frequency. The measurement object may also comprise a list of cells to be considered (white-list or black-list) as well as associated parameters, for example, frequency- or cell-specific offsets.

Another example of a measurement configuration is a reporting configuration. Reporting configurations comprise periodic or event-triggered criteria which cause the user equipment to send a measurement report, as well as the details of what information the user equipment is expected to report. The information to be reported may comprise quantities such as, for example. Received Signal Code Power (RSCP) for UMTS or Reference Signal Received Power (RSRP) for LTE, and the number of cells.

Another example configuration may be measurement identities. Measurement identities identify a measurement and define the applicable measurement object and reporting configuration. Each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

A further configuration example is quantity configurations. Quantity configurations define the filtering to be used on each measurement. One quantity configuration is configured per RAT type, and one filter can be configured per measurement quantity.

Yet another example configuration is measurement gaps. Measurement gaps define time periods when no uplink or downlink transmissions will be scheduled, so that the user equipment may perform the measurements, for example, inter-frequency measurements where the user equipment has only one Tx/Rx unit and supports only one frequency at a time. The measurement gaps configuration are common for all gap-assisted measurements.

The E-UTRAN configures only a single measurement object for a given frequency, but more than one measurement identity may use the same measurement object. The identifiers used for the measurement object and reporting configuration are unique across all measurement types. It is possible to configure the quantity which triggers the report (RSCP or RSRP) for each reporting configuration.

In LTE, some examples of measurement metrics used are the Reference Signal Received Power (RSRP) and Reference Signal Received Quality (RSRQ). RSRP is a cell specific measure of signal strength and it is mainly used for ranking different cells for handover and cell reselection purposes, and it is calculated as the linear average of the power of the Resource Elements (REs) which carry cell-specific Reference Signals (RSs). The RSRQ, on the other hand, also takes the interference into consideration by taking the total received wideband power into account as well.

One of the measurement configuration parameters that user equipments receive from their serving eNBs is the S-measure. The S-measure tells the user equipment when to start measuring neighboring cells. If the measured RSRP of the serving cell falls below the S-measure, indicating the signal of the serving cell is not that strong anymore, the user equipment starts measuring the signal strength of RSs from the neighboring cells. The S-measure is an optional parameter and different S-measure values may be specified for initiating intra-frequency, inter-frequency and inter-RAT measurements. Once the user equipment is enabled for measuring, it may report the serving cell, listed cells (i.e. cells indicated as part of the measurement object), and/or detected cells on a listed frequency (i.e. cells which are not listed cells but are detected by the user equipment).

There are several measurement configuration parameters that specify the triggering of measurement reports from the user equipment. An example of event-triggered criteria, which is specified for intra-RAT measurement reporting in LTE, is Event A1. Event A1 triggers when the Primary serving cell, PCell becomes better than an absolute threshold. Another example is Event A2, which triggers when the PCell becomes worse than the absolute threshold. A further example is Event A3, which triggers when the neighbor cell becomes better than an offset relative to the PCell. A further example is Event A4, which triggers when the neighbor cell becomes better than the absolute threshold. Yet another example is Event A5, which triggers when the PCell becomes worse than one absolute threshold and the neighbor cell becomes better than another absolute threshold. Another example is Event A6, which triggers when the neighbor cell becomes better than an offset relative to a secondary cell (SCell).

Various event-triggered reporting criteria are specified for inter-RAT mobility. An example is Event B1, which triggers when the neighbor cell becomes better than an absolute threshold. A further example is Event B2, which triggers when the serving cell becomes worse than one absolute threshold and a neighbor cell becomes better than another absolute threshold.

Figure 14:
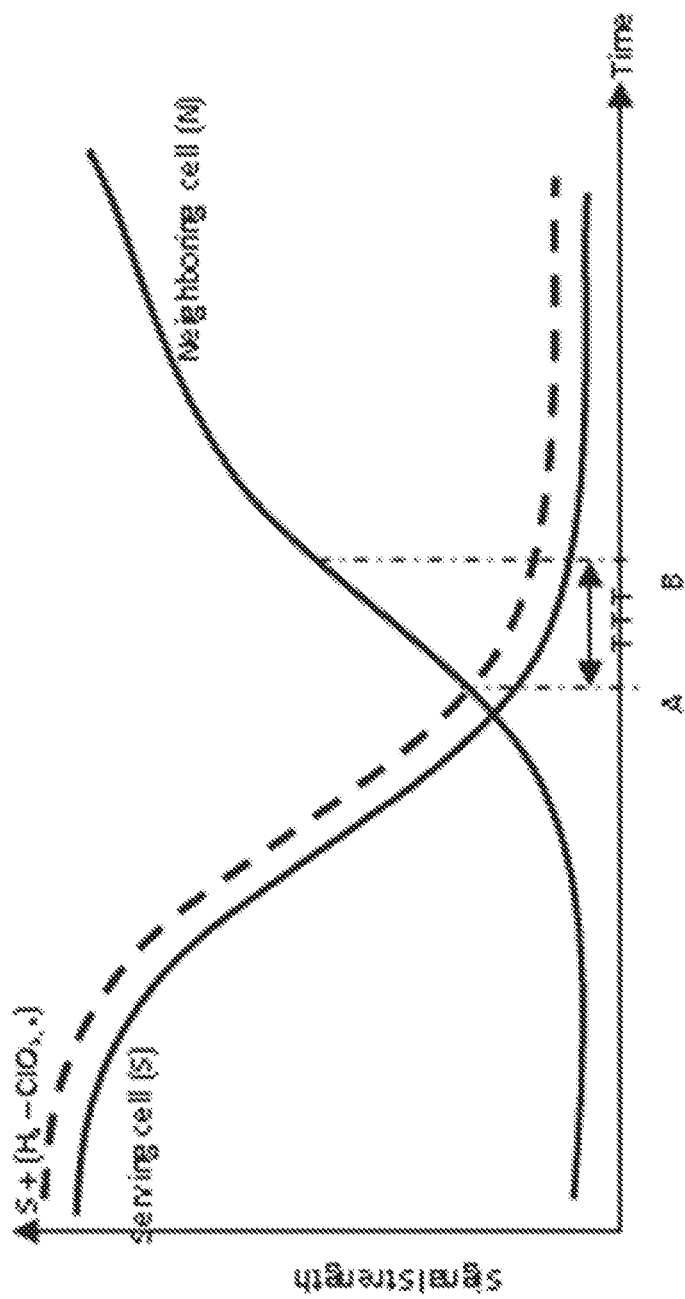
FIG. 14 is an illustrative example of handover triggering.

An example of a measurement report triggering event related to handover is A3, and its usage is illustrated in FIG. 14. The triggering conditions for event A3 can be formulated as:

$$N > S + HOM \qquad (1)$$

where N and S are the signal strengths of the neighbor and serving cells, respectively, and HOM is the handover margin. HOM is the difference between the radio quality of the serving cell and the radio quality needed before attempting a handover. The radio quality is measured either using RSRP or RSRQ (see 3GPP TS 36.133 for further explanation).

The user equipment triggers the intra-frequency handover procedure by sending Event A3 report to the eNB. This event occurs when the user equipment measures that the target cell is better than the serving cell with a margin "HOM". The user equipment is configured over RRC when entering a cell and the HOM is calculated from the following configurable parameters:

$$HOM = Ofs + Ocs + Off - Ofn - Ocn + Hys \qquad (2)$$

where Ofs is the frequency specific offset of the serving cell, Ocs is the cell specific offset (CIO) of the serving cell. Off is the a3-Offset. Ofn is the frequency specific offset of the neighbor cell, Ocn is the CIO of the neighbor cell and Hys is the hysteresis.

If the condition in (1) is satisfied and it remains valid for a certain duration known as Time To Trigger (TTT), the user equipment sends a measurement report to the serving eNB (in FIG. 14, event A3 is satisfied at point A and measurement report is sent at point B in time). When the serving eNB gets the measurement report, it may initiate a handover towards the neighbor.

In addition to event-triggered reporting, the user equipment may be configured to perform periodic measurement reporting. In this case, the same parameters may be configured as for event-triggered reporting, except that the user equipment starts reporting immediately rather than only after the occurrence of an event.

Handover

Handover is one of the important aspects of any mobile communication system, where the system provides service continuity of the user equipment by transferring the connection from one cell to another depending on several factors such as signal strength, load conditions, service requirements, etc. The provision of efficient/effective handovers (minimum number of unnecessary handovers, minimum number of handover failures, minimum handover delay, etc.), would affect not only the Quality of Service (QoS) of the end user but also the overall mobile network capacity and performance.

In LTE, UE-assisted, network controlled handover is utilized (3GPP TS 36.300). The handover is based on user equipment reports, and the user equipment 101 is moved, if required and possible, to the most appropriate cell that will assure service continuity and quality.

Figure 15:
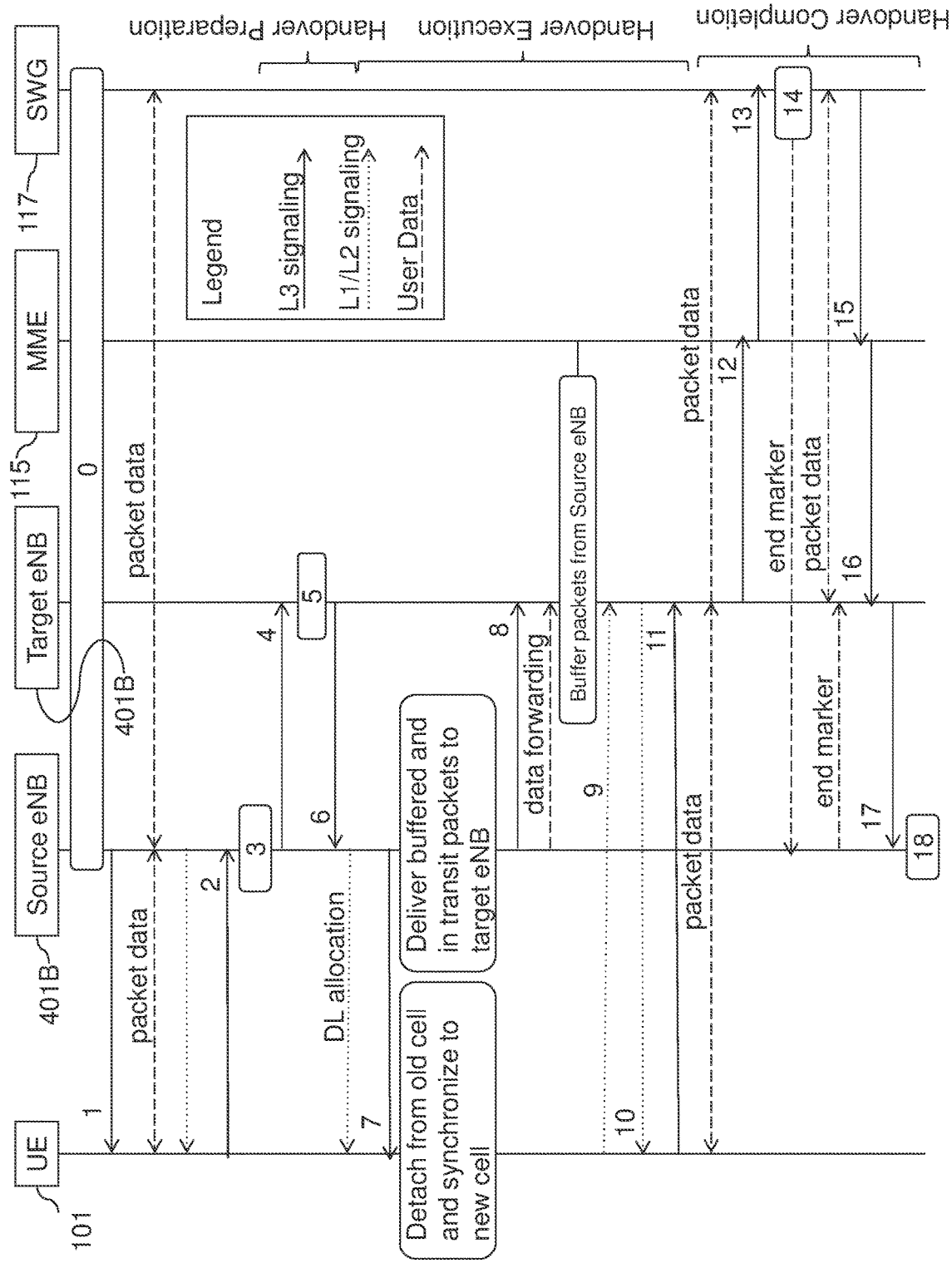
FIG. 15 is a messaging diagram illustrating an example of an X2 handover in LTE.

Handover is performed via the X2 connection, whenever available, and if not, using S1 (i.e., involving the Core Network (CN)). The X2 Handover process is shown in FIG. 15. The handover procedure can be sub-divided into three stages of preparation (initiation), execution and completion.

The main steps of the handover process are described below:

1. The source eNB configures the user equipment measurement procedures. This may be done either when the user equipment first connects to an eNB (comprised in the HO command as described later) or later one by sending measurement reconfigurations. The measurement configurations are sent to the user equipment by using the measConfig Information Element (IE) that is comprised in the RRCConnectionReconfiguration message.

2. The user equipment is triggered to send a measurement report by the measurement rules set as described in the previous section.

3. Based on the received measurement report and other RRM information, the source eNB makes a decision to hand over the user equipment to the target.

4. The source eNB issues a HANDOVER REQUEST message to the target eNB passing necessary information to prepare the HO at the target side. The source eNB must indicate the cause of the HO in this message. The cause of the HO may be related to radio reasons, resource optimization and/or reducing a load in the serving cell.

5. Admission Control may be performed by the target eNB.

6. The target eNB prepares HO with L1/L2 and sends the HANDOVER REQUEST ACKNOWLEDGE to the source eNB. The HANDOVER REQUEST ACKNOWLEDGE message comprises an Information Element (IE) called "Target eNB to Source eNB Transparent Container". This IE basically comprises the handover command message (RRC-ConnectionReconfiguration that comprises the nobilityControlInfo IE) that is sent to the user equipment in the next step.

There are many main elements of the RRCConnection-Reconfiguration message. An example of such an element is an optional measurement configuration, for example, a measConfig IE, to be used in the target cell.

Another example is mobility control information, for example, a mobilityControlInfo IE, which is provided only during handovers. This IE comprises information the user equipment needs to execute the handover such as the PCI of the target cell, the Cell Radio Network Temporary Identifier (C-RNTI) assigned to the user equipment in the target cell, a timer value of handover expiry, a dedicated preamble for the Random Access Channel (RACH) in the target cell, the carrier frequency/bandwidth to be used in the UL/DL and common radio resource configurations.

A further example is a dedicated radio resource configuration, for example, a radioResourceConfigDedicated IE, which mainly comprises lists of DRB/SRBs to add or modify, for example, srb-ToAddModList and drb-ToAddModList IEs, respectively. The dedicated radio resource configuration may further comprise the list of DRBs to be released, for example, drb-ToRelease List IE, if there are any bearers to be released. The lists are populated based on the admission control decision.

Additional information may also be provided in the RRCConnectionReconfiguration message such as information related to security and carrier aggregation.

It should be appreciated that as soon as the source eNB receives the HANDOVER REQUEST ACKNOWLEDGE, or as soon as the transmission of the handover command is initiated in the downlink, user plane data forwarding may be initiated.

7. The source eNB sends the handover command, for example, the RRCConnectionReconfiguration message comprising the mobilityControlInfo, towards the user equipment on behalf of the target eNB.

8. The source eNB sends the SN (Sequence Number) STATUS TRANSFER message to the target eNB, which comprises the ID of the impacted E-RABs and PDCP SNs for UL and DL data transfer.

9. After receiving the RRCConnectionReconfiguration message comprising the mobilityControlInfo, the user equipment performs synchronisation with the target eNB and accesses the target cell via RACH. If the RRCConnectionReconfiguration comprised dedicated RACH information is received, the dedicated preamble comprised in there is used for the RACH access. Otherwise, a contention based approach is taken.

Also, based on the DRB and SRB information comprised in the radioResourceConfigDedicated IE, the user equipment may reset the MAC. Based on such information, the user equipment may also re-establish the PDCP for all the RBs that are established, for example, using the new security keys provided from the target.

Based on the information comprised in the radioResourceConfigDedicated JE, the user equipment may also release all the DRBs indicated in the drb-ToReleaseList, which comprises releasing the associated PDCP. RLC entities and DTCH logical channel. Based on the information comprised in the radioResourceConfigDedicated IE, the user equipment may reconfigure all the DRBs indicated in the drb-ToAddModList by reconfiguring the associated PDCP, RLC entities and DTCH logical channels using the configuration parameters comprised in the drb-ToAddModList.

Based on the information comprised in the radioResourceConfigDedicated IE, the user equipment may also reconfigure all the SRBs indicated in the srb-ToAddModList by reconfiguring the associated RLC entity and the DCCH logical channel used.

10. The target eNB responds with UL allocation and timing advance.

11. When the user equipment has successfully accessed the target cell, the user equipment sends the RRCConnectionRecon/igurationConmplete message to the target to confirm that the handover succeeded. Optionally, the user equipment may indicate to the target if it has information regarding earlier a Radio Link Failure (RLF) or other logged measurements that could be used for optimization purposes. After the confirmation is received, the target eNB may begin sending data to the user equipment and the user equipment send data to the target based on the scheduling grants it is receiving. However, the data from the CN is still routed to the source eNB.

12. The target eNB sends a PATH SWITCH REQUEST message to MME to inform that the user equipment has changed the cell.

13. The MME sends a MODIFY BEARER REQUEST message to the Serving Gateway.

14. The Serving Gateway switches the downlink data path to the target side. The Serving gateway sends one or more "end marker" packets on the old path to the source eNB and then may release any U-plane/TNL resources towards the source eNB.

15. The Serving Gateway sends a MODIFY BEARER RESPONSE message to MME.

16. The MME confirms the PATH SWITCH REQUEST message with the PATH SWITCH REQUEST ACKNOWLEDGE message.

17. By sending the user equipment CONTEXT RELEASE message, the target eNB informs success of HO to source eNB and triggers the release of resources by the source eNB.

18. Upon reception of the UE CONTEXT RELEASE message, the source eNB may release radio and C-plane related resources associated to the user equipment context. Any ongoing data forwarding may continue.

OVERVIEW OF THE EXAMPLE EMBODIMENTS

LTE currently supports only one to one connections between user equipments and eNBs. As such, when a handover is initiated, the target is asked to admit all the bearers of the user equipment. If for some reason, such as overload situation, that some of the bearers can't be admitted at the target, the source may either cancel the handover (and possibly try another candidate target) or accept it and handover the user equipment to the target, which will result in the dropping of the non-admitted bearers. This may have severe consequences on the overall experience of the user.

Current specifications do not allow the setup of bearers in parallel and in multiple eNBs for the same user equipment, which is needed for enabling multiple connectivity. This would allow an optimal distribution of bearers depending on their QoS and UL/DL requirements. Some of the example embodiments presented herein address how to enable mobility and bearer management procedures allowing for distribution of user equipment bearers across multiple eNBs with the possibility to connect a user equipment to multiple eNBs.

According to some of the example embodiments, different mechanisms for enabling multiple connectivity between a user equipment and multiple cells are proposed. Different selective handover and related bearer management and measurement configuration procedures are described. The basic concept of selective handover as well as the required changes in the communication of eNBs involved in the selective handover is also described. According to some of the example embodiments, the main focus presented herein is the communication aspects between the eNB (specifically, the anchor) and the user equipment.

Example embodiments described herein discuss the use of a selective handover. A selective handover may be a handover of a subset of bearers associated with a user equipment. It should be appreciated that the sub-set may be an empty subset (e.g., zero bearers), any number less than the full set of bearers, or the full set of bearers associated with the user equipment. It should be appreciated herein that a selective handover may comprise a variety of different subcases. Examples of such subcases are provided below.

1) As a first use case, an anchor may keep all bearers, both SRBs and DRBs. Thus, the selective handover may be an empty handover where target is just prepared, and the user equipment synchronizes with the target without handing over any radio bearers.

2) A second use case may be that the anchor keeps all SRBs and some DRBs, while the target receives some DRBs associated with the user equipment via the handover procedure.

3) A third use case may be that the anchor keeps all SRBs, while target is handed over all DRBs.

4) As a fourth use case, the role of the anchor node may be switched. As an example, three methods for the switching of anchors are provided below.

a. According to some of the example embodiments, the target becomes the anchor (i.e., all SRBs are handed over to the target), and all DRBs may remain in source (which is the new assisting node). It should be appreciated that this may be viewed as an opposite scenario of use case 3.

b. According to some of the example embodiments, the target may become the anchor (i.e., all of the SRBs are handed over to the target), and the target may also take some DRBs. Meanwhile, some of the DRBs may still remain at the source. It should be appreciated that this may be viewed as an opposite scenario of use case 2.

c. According to some of the example embodiments, the target becomes the anchor (i.e., all of the SRBs are handed over to the target), and the target also takes all of the DRBs. It should be appreciated, in contrast to a full handover, here a relationship with the source is maintained. It should be appreciated that this may be viewed an opposite scenario of use case 1.

5) As a fifth use case, a selective handover may be provided between to assisting nodes. In this example use case the anchor remains the same, and some DRBs are switched between two the two assisting nodes.

6) As a sixth use case, a split of the control plane in the anchor and assisting node may occur. As an example, three methods for the split are provided.

a. According to some of the example embodiments, the source keeps all DRBs and some SRBs. The target gets some SRBs as a result of the handover procedure.

b. According to some of the example embodiments, the source may keep some of the DRBs and some of the SRBs, while the target receives some of the SRBs and some of the DRBs associated with the user equipment as a result of the selective handover.

c. According to some of the example embodiments, the source may keep some of the SRBs, while the target gets all DRBs and some of the SRBs associated with the wireless terminal as a result of the selective handover.

Further details of the example embodiments are described below according to the corresponding sub-heading. It should be appreciated that the example embodiments are described with the use of an LTE based system as an example, however, the example embodiments may be applied to any communications system. It should also be appreciated that the term wireless terminal and user equipment may be used interchangeably. It should further be appreciated that the term assisting node and assisting base station may also be used interchangeably. For the sake of brevity, the descriptions below treat mostly the case of dual connectivity with two cells, but the ideas are equally applicable for the case where the user equipment is connected to more than two cells at the same time.

Overview of Selective Handovers

According to some of the example embodiments, a user equipment is instructed to hand over only a sub set of its bearers towards a target cell while maintaining the other bearers with the original serving cell.

According to some of the example embodiments, a user equipment is asked to perform an empty handover to a target, for example, no bearers are provided in the bearers to be handed over list, just to prepare the user equipment for future selective handovers. For example, when the signal quality of a neighbor cell reaches a certain threshold, the user equipment is asked to perform this empty handover. After the empty handover, the user equipment still has all the bearers (both DRBs and SRBs) terminated at the source. However, the user equipment now has time alignment and synchronization with the target cell.

According to some of the example embodiments, a new user equipment radio access capability parameter is defined that indicates whether a user equipment supports multiple connectivity or not. This could be a simple Boolean flag, for example, the presence of which indicating support, or a detailed parameter that comprises information such as the maximum number of support links and any other multiple connectivity related restrictions.

Selection of Bearers to be Handed Over

According to some of the example embodiments, a source eNB may decide to initiate a selective handover of a subset of the bearers of a user equipment towards a target eNB. Several mechanisms can be employed by the source eNB to decide which bearers to choose for the selective handover.

According to some of the example embodiments, the source eNB has a static mapping that specifies which type of bearers should be comprised in the selective handover. Several mapping rules could be used, such as only non-GBR bearers, only GBR bearers, only GBR bearers with MBR above or below a certain level, only GBR bearers with GBR above or below a certain level, or only bearers that belong to a certain (set) of QCI(s), etc.

For example, if the deployment scenario is that the macro has good coverage and a pico node is deployed in another carrier frequency for high data rate boosting, the static mapping rule may be to choose only the high data rate bearers for selective handover towards the pico node.

According to some of the example embodiments, the source eNB configures the user equipment with multiple measurement reporting configurations, and depending on which report gets triggered, decides the bearers to be comprised in the selective handover. As a simple example, the source eNB may configure two measurement configurations based on the A3 Event, and set different threshold values for each. If the first report gets triggered, the eNB may choose certain bearers (e.g. non GBR bearers) for the selective handover, and similarly, if the second report gets triggered, the eNB may choose other kind of bearers (e.g. GBR bearers) for the selective handover. Note that this is just an example, and other events can be used to select different bearers.

According to some of the example embodiments, the source eNB may decide which bearers to handover based on the buffer levels of the different bearers. For example, only bearers that have buffers filled above or below a certain level are chosen for selective handover.

According to some of the example embodiments, new triggering events, which are specifically suitable for selective handovers, are defined. For example, an A7 event may be defined that is triggered only when the user equipment buffer raises above a specified threshold level for certain kind of bearers and the radio conditions with the serving cell becomes worse than a specified threshold.

According to some of the example embodiments, the source eNB may decide which bearers are to be handover based on the load situation at the source and target eNBs. For example, more bearers could be comprised in the selective handover if the target eNB is unloaded. Legacy X2 RESOURCE STATUS UPDATE messages could be employed to exchange the load status information between the source and target eNBs.

According to some of the example embodiments, a source eNB may configure a lower threshold value to trigger early measurements and when these measurements are received, the serving eNB may decide to initiate selective handover to the target eNB but with an empty bearer list (i.e. not handing over anything). The purpose of this "empty handover" may be to allow synchronization of the user equipment to the target eNB cell. In case such "empty" selective handover is carried out and the user equipment is synchronized to the target eNB cell, it will be possible to transmit future mobility signalling from both serving and target cell.

According to some of the example embodiments, a source eNB may configure a higher threshold value in a measurement configuration, and when such measurement is triggered, the serving eNB initiates a full (legacy) handover towards the target eNB. It should be appreciated that the selection mechanisms described above may be used in any combination.

Initiation of the Handover

According to some of the example embodiments, a source eNB may decide to initiate the handover of the signalling radio bearers towards the target eNB. After the handover the target becomes the anchor node (the termination point for the control plane) and the source becomes the assisting node. The source eNB may also choose to comprise some data radio bearers in this handover request. That is, after the handover, the source might handle some data radio bearers of the user equipment, while the target will handle all the signalling radio bearers and the other data radio bearers.

During such handover procedure and in case the user plane, for example, PDCP or PDCP and RLC, is terminated in the anchor node, the mechanism comprises switching all user plane bearers traffic from the core network to the new anchor node. Namely, in an anchor node terminated the user plane scenario, a handover that implies a change in the anchor node also implies switching user plane bearers' traffic termination from an old anchor node to a new anchor node. In this procedure, the PATH SWITCH REQUEST message towards the core network will indicate switching of all bearers towards the new anchor node, while (in case source and target cell do not reside in the same node) the X2: HANDOVER REQUEST message will indicate to the new anchor node (target node) which bearer traffic shall be transmitted over the air at the new anchor node cell and which shall be transmitted at the new assisting node cell.

According to some of the example embodiments, the target eNB does not belong to the same soft cell as the source eNB, for example, the target eNB an independent eNB such as a neighbour macro eNB or a pico eNB operating as a standalone cell. That is, for the concerned user equipment, the target eNB will play the role of the assisting eNB.

In legacy handover, the source eNB prepares the target eNB using the HANDOVER REQUEST message over X2, as shown in FIG. 15. The contents of this message are shown in Table 1. This X2AP message comprises a transparent container comprising the RRC context from the source. For selective handover, the same principles may be reused, but the message content has to be modified, since the RRC control context remains in the source eNB, and only a set of E-RABs are requested to be handed over.

TABLE 1

| X2 HANDOVER REQUEST message | |
|---|---|
| IE/Group Name | Presence |
| Message Type | M |
| Old eNB UE X2AP ID | M |
| Cause | M |

TABLE 1-continued

X2 HANDOVER REQUEST message

| IE/Group Name | Presence |
|---|---|
| Target Cell ID | M |
| GUMMEI | |
| UE Context Information | |
| >MME UE S1AP ID | M |
| >UE Security Capabilities | M |
| >AS Security Information | M |
| >UE Aggregate Maximum Bit Rate | M |
| >Subscriber Profile ID for RAT/Frequency priority | O |
| >E-RABs To Be Setup List | |
| >>E-RABs To Be Setup Item | |
| >>>E-RAB ID | M |
| >>>E-RAB Level QoS Parameters | M |
| >>>DL Forwarding | O |
| >>>UL GTP Tunnel Endpoint | M |
| >RRC Context | M |
| >Handover Restriction List | O |
| >Location Reporting Information | O |
| >Management Based MDT Allowed | O |
| UE History Information | M |
| Trace Activation | O |
| SRVCC Operation Possible | O |
| CSG Membership Status | |

According to some of the example embodiments, the target eNB is informed that a given handover is a selective handover rather than a legacy handover, for example, a full handover where all the bearers of the user equipment have to be handed over, during handover preparation signaling. In case the target eNB receives multiple selective handover requests concerning the same user equipment from the same source eNB, it shouldn't be interpreted as an error, but rather as a request to selectively hand over even more bearers of the user equipment towards the target.

According to some of the example embodiments, if the anchor connection is lost while the user equipment has an assisting link active, the assisting eNB may assume the role of the anchor, for example, terminate the control plane and SRBs. The new anchor (the old assisting eNB) may use the MME UE S1AP ID that was received during the handover request to recover the context of the user equipment from the MME (or any other mobility management node) and hence be able to re-establish any radio bearers that were being served via the previous anchor.

The legacy X2 HANDOVER REQUEST message already comprises a list of E-RABs to be setup. For the case of selective handover, this list may also be used to cover the data radio bearers that the anchor wants to handover to the assisting cell. The rest of the E-RABs will remain at the source eNB. So, this list may be used as is. However, if a partial list of E-RABs is comprised in the X2: HANDOVER REQUEST message the target is assumed to send a PATH SWITCH REQUEST message to the MME indicating switching of bearers listed in X2: HANDOVER REQUEST message. Current specifications in TS 36.413 specify that "[i]f the E-RAB To Be Switched in Downlink List IE in the PATH SWITCH REQUEST message does not comprise all E-RABs previously comprised in the UE Context, the MME shall consider the non-included E-RABs as implicitly released by the eNB."

The above means that according to current specifications the bearers not listed in the PATH SWITCH REQUEST and assigned to the user equipment will be automatically dropped by the MME (or any other mobility management node). Therefore, according to some of the example embodiments, two alternatives may be envisioned to prevent such E-RAB termination.

First, the PATH SWITCH REQUEST message shall be enhanced with a new IE indicating that a selective handover is ongoing and the non-listed E-RABs shall not be dropped. Second, the MME shall be configured, for example, via the OAM system, so to avoid E-RAB terminations for the E-RABs not listed in the PATH SWITCH REQUEST message. The latter decision may be taken either unconditionally or depending on a source node identity, which may be derived by the Source MME UE S1AP ID IE and Source MME GUMMEI IE in PATH SWITCH REQUEST message.

An example of how the PATH SWITCH REQUEST message IEs may be enhanced is shown in Table 1a, where a new IE named Selective Handover Indicator IE has been added as an example of how selective handovers could be flagged to the MME.

TABLE 1a

PATH SWICTH REQUEST message

| IE/Group Name | Presence | Range | Semantics description | Criticality | Assigned Criticality |
|---|---|---|---|---|---|
| Message Type | M | | | YES | reject |
| eNB UE S1AP ID | M | | | YES | reject |
| E-RAB To Be Switched in Downlink List | | 1 | YES | reject | |
| >E-RABs Switched in Downlink Item IEs | | 1 to <maxnoof ERABs> | | EACH | reject |
| >>E-RAB ID | M | | | — | |
| >>Transport layer address | M | | | — | |
| >>GTP-TEID | M | | To deliver DL PDUs | — | |
| Source MME UE S1AP ID | M | | | YES | reject |
| E-UTRAN CGI | M | | | YES | ignore |
| TAI | M | | | YES | ignore |
| UE Security Capabilities | M | | | YES | ignore |

TABLE 1a-continued

PATH SWICTH REQUEST message

| IE/Group Name | Presence | Range | Semantics description | Criticality | Assigned Criticality |
|---|---|---|---|---|---|
| CSG Id | O | | | YES | ignore |
| Cell Access Mode | O | | | YES | ignore |
| Source MME GUMMEI | O | | | YES | ignore |
| Selective Handover Indicator | O | ENUMERATED (true, . . . ) | This IE indicates to MME that the handover is selective. IT helps MME to decide whether to maintain bearers not listed in the E-RABs To Be Switched in Downlink List | YES | ignore |

Indication of a Selective Handover

According to some of the example embodiments, a selective handover is indicated to the user equipment by providing an empty srb-ToAddModList or not providing it at all, for example, in the radioResourceConfigDedicated JE of the RRCConnectionReconfiguration message, which is a clue to the user equipment that the SRBs still remain with the source and as such the current procedure is a selective handover.

According to some of the example embodiments, a new optional IE called "Selective HO" in the mobilityControlInfo IE is provided. This IE may take different values depending on the type of selective handover that is being requested. For example, it may have two values, a value of "0" referring to "data radio bearers", for example, meaning only the data radio bearers listed in the drb-ToAddModList are to be handed over. The IE may also have a value of "1", which may refer to "signaling radio bearers", for example, meaning signaling radio bearers indicated in the srb-ToAddModList as well as the data radio bearers provided in the drb-ToAddModList are to be handed over. This way of communicating selective handover allows the possibility to switch the anchor node from the source to the target.

According to some of the example embodiments, a selective handover is indicated to the user equipment by not providing the radioResourceConfigDedicated IE in the RRCConnectionReconfiguration message. This is a special kind of selective handover, which may be referred to as "empty handover". An empty handover may be used to set up a communication link with the target without actually handing over any DRBs or SRBs.

According to some of the example embodiments, the indication that the handover is selective is added to the handover command message that is sent to the user equipment by the target. The target, upon receiving a selective handover request from the source, will use one of the methods described above to construct the RRCConnectionReconfiguration message that is sent towards the source via the Target eNB to Source eNB Transparent Container IE of the handover request acknowledgment which is then forwarded to the user equipment as the handover command from the source.

According to some of the example embodiments, the indication that the handover is selective is added to the handover command message that is sent to the user equipment by the source. The target will send a legacy RRCConnectionReconfiguration message that is sent towards the source via the Target eNB to Source eNB IE of the handover request acknowledgment. When the source receives this as a response to a selective handover it has sent out, it will modify the RRCConnectionReconfiguration message using one of the methods described above, and forwards this to the user equipment as the handover command.

User Equipment Functionality During Selective Handover

According to some of the example embodiments, when the user equipment receives an RRCConnectionReconfiguration message indicating a selective handover, it will perform the following main actions:

a. Start synchronizing to the downlink of the target cell.

b. Add the indicated C-RNTI to the list of C-RNTIs being used and associate it with the target cell, for example, using the target cell's PCI.

c. Initializes a new protocol stack that corresponds with the target cell and configures the MAC and PHY layers by applying default configurations as well as on the configurations indicated in the radioResourceConfigCommon and other relevant IEs of the mobilityControlInfo.

d. Release all the DRBs comprised in the drb-ToReleaseList, which comprises releasing the associated PDCP. RLC entities and DTCH logical channel.

e. Establish the PDCP, RLC and DTCH for all the DRBs in the drb-ToAddModList in the newly configured protocol stack that is associated with the target cell, using the protocol configurations provided in the list and for the PDCP, additionally utilizing the new security configurations.

f. Transfer any outstanding PDCP SDUs, for example, those that are in the retransmission buffer of the anchor, of all the DRBs in the drb-ToAddModList to which lossless handover is applicable to the corresponding new PDCP entities that are setup in the previous step.

g. Release all the DRBs provided in the drb-ToAddModList, which comprises releasing the associated PDCP. RLC entities and DTCH logical channel, from the source protocol stack.

h. If the srb-ToAddModList is provided and is not empty, which indicates the switching of the anchor, then setup the SRBs in the new protocol stack by applying the default SRB configurations as well as establishing the PDPC, if needed, and if so applying the new security settings. The RLC and DCCH, based on the configurations comprised in the in the srb-ToAddModList, are also established. The user equipment further releases the SRBs from the protocol stack associated with the source.

According to some of the example embodiments, if the selective handover is of the type for adding an assisting node, for example, only DRBs are handed over to the target, the target replies to the random access synchronization request of the user equipment by providing a random access response that comprises a timing advance command, but no uplink grant.

According to some of the example embodiments, if the selective handover is of the type for adding an assisting node, for example, only DRBs are handed over to the target, the user equipment, upon the completion of the handover procedure, for example, (i.e. synchronization with the target, reception of Timing advance from the target and configuring the protocol stack corresponding with the target), sends out an RRCConnectionReconfigurationComplete message towards the anchor.

According to some of the example embodiments, if the selective handover is of the type for adding an assisting node, for example, only DRBs are handed over to the target, and the user equipment does not have enough resources to transmit the RRCConnectionReconfigurationComplete message towards the anchor, the user equipment may request for an UL grant using a scheduling request.

According to some of the example embodiments, if the selective handover is of the type for switching the anchor, for example, SRBs are handed over to the target, the target replies to the random access synchronization request of the user equipment by providing a random access response that comprises a timing advance command and also an uplink grant.

According to some of the example embodiments, if the selective handover is of the type for switching the anchor, for example, SRBs are handed over to the target, the user equipment, upon the completion of the handover procedure (i.e. synchronization with the target, reception of Timing advance and UL grant from the target and configuring the protocol stack corresponding with the target), sends out an RRCConnectionReconfigurationComplete message towards the new anchor.

Measurement Configurations

According to some of the example embodiments, a user equipment is configured by the anchor with multiple measurement reporting configurations, and sends these reports independently of each other when their measurement triggering criteria are fulfilled. As a simple example, the anchor may configure two measurement configurations based on the A3 Event, and set different threshold values for each. Note that this is just an example, and other events can be used to select different bearers.

According to some of the example embodiments, a user equipment is configured with new triggering events which are defined specifically for selective handover. For example, an A7 event may be defined in the reportConfigEUTRA IE of the measurement reporting configuration, which is triggered only when the user equipment's buffer rises above a specified threshold level for certain kind of bearers and the radio conditions with the serving cell becomes worse than a specified threshold.

According to some of the example embodiments, the user equipment is configured with multiple sets of measurements, some applicable to all cells, some applicable only to cells that support selective handovers, and some applicable only to cells that support full handovers only.

The configuration of multiple measurement sets may be achieved, for example, when the anchor explicitly provides all the neighboring cells of a certain type in the corresponding measurements configurations.

As another example, the configuration of multiple measurement sets may be provided with the anchor indicates, for example, via a new IE in the measurement configuration called "Cell HO capability", to which type of cells the measurement configuration applies. This assumes that user equipments are able to find out what is the HO capability of a cell they are measuring. For example, the HO capability of a cell may be provided as a flag in the broadcast information of the cells or cells supporting selective handover are given a certain range of PCIs reserved for a certain HO capability or the anchor communicates the HO capability of its neighbor cells to the user equipment via a new RRC message, etc.

According to some of the example embodiments, user equipments may be asked to report cells that support selective handover earlier than those that don't support it, for example by having a lower threshold in A3, as a more reliable signal level might be required from a neighbor to hand over a user equipment completely as compared to handing over only a subset of the user equipment bearers.

According to some of the example embodiments, when a user equipment is connected to more than one cell, multiple measurement configuration parameters are set up for each cell that is serving the user equipment. Providing measurement configuration for individual cells may be realized in several ways. As an example, different values may be used for the offset parameters such as Ofn, Ocn, Ofp and Ocp that are part of the MeasObjectEUTRA IE that is part of the measurement configuration setup. As another example, different thresholds may be used for each serving cell, such as A3 offset and TTT, which are part of the reportConfigEUTRA IE.

According to some of the example embodiments, the anchor decides the values for these configuration parameters for all the serving cells. According to some of the example embodiments, the assister sends out the configuration parameters to be used for its own cell that is going to be connected to the user equipment, and the anchor communicates this to the user equipment on behalf of the new assisting node that is being added.

According to some of the example embodiments, the serving cell to which a certain measurement configuration is applicable to are indicated explicitly in the measurement configuration messages. The explicit indication may be done in several ways.

According to some of the example embodiments, the explicit indication is provided in the PCI of the cell to which the measurement configuration applies to. The indication may be comprised as a new IE inside the measConfig IE. According to some of the example embodiments, the indication may be in the form of a numerical ID of increasing values assigned for each serving cell of the user equipment, for example, 0 for the anchor, 1 for the first assister, 2 for the second assister, etc. This ID may be comprised as a new IE inside the measConfig IE. The IDs associated with each serving cell may be explicitly communicated when an assisting node is added to a user equipment, or it may be done implicitly by increasing the serving cell count simultaneously at the anchor and the user equipment.

Bearer Procedures

According to some of the example embodiments, when a user equipment is connected to more than one cell and bearers are to be setup, modified or released with an assisting cell, the anchor communicates this to the user equipment via an RRCConnectionReconfiguration message (without mobilityControlInfo). The message comprises an indication that the configurations comprised in the message are for an assisting connection, rather than the anchor. A new IE may be introduced in the message to indicate the assisting cell by using the PCI of the assisting cell, or another agreed upon ID that is known to both the user equipment and the anchor as described above. The concerned bearers are indicated in drb-ToAddModList and/or drb-ToReleaseList IEs in the radioResourceConfigDedicated IE and the user equipment applies the settings there on the protocol stack of the indicated assisting link. The user equipment may find out that the RRCConnectionReconfiguration message is intended for the anchor link if the message doesn't comprise the assisting indicator IE or the value of it set to the ID (PCI or another agreed upon ID) of the anchor cell.

According to some of the example embodiments, when a user equipment is connected to more than one cell and bearers are to be setup, modified or released with a assisting cell and also an anchor cell, the anchor communicates this to the user equipment via an RRCConnectionReconfiguration (without mobilityControlInfo) message that comprises an explicit indication to the link that the bearers are corresponding to. A new IE may be introduced in the drb-ToAddModList and/or drb-ToReleaseList IEs, with the value to be set to the PCI of the relevant cell or another agreed upon ID that is known to both the user equipment and the anchor as described above. The user equipment may find out that the bearer to be setup, modified or released is on the anchor link either if the new indicator IE is not comprised in the drb-ToAddModList and/or drb-ToReleaseLists, or if its value is set to the ID, for example, PCI or another agreed upon ID, of the anchor cell.

Subsequent Selective Handover

According to some of the example embodiments, bearers may be handed over to a assister link, after the completion of a selective handover (referred to as subsequent selective handover from here onwards). There are several ways of communicating this to the user equipment. On example is using the same messaging structure as a selective handover, wherein the user equipment may recognize the message as a subsequent handover because the user equipment already has a link established with the cell indicated in the target PCI comprised in the mobilityControlInfo IE.

Another example for indicating to the user equipment that the handover is a subsequent selective handover is by using a similar messaging structure as a selective handover but excluding information such as mobilityControlInfo that is not needed now as the user equipment is already connected to the assister. According to this example embodiment, an assisting indicator IE, which is similar to the bearer setup/modification/release procedure described above, may be used. Furthermore, a selective HO indicator IE may be used. The selective HO indicator may be used to differentiate it from the bearer setup/modification/release procedure described above.

According to some of the example embodiments, when a user equipment gets a subsequent selective handover command, it performs similar operations as in a selective handover, discussed under the subheading 'User equipment functionality during selective handover', apart from the procedures a, b and c as the user equipment is already synchronized to the target. Furthermore, the user equipment has the C-RNTI from the target and has already initialized the protocol stack corresponding to the assisting link.

Example Node Configuration

Figure 16:
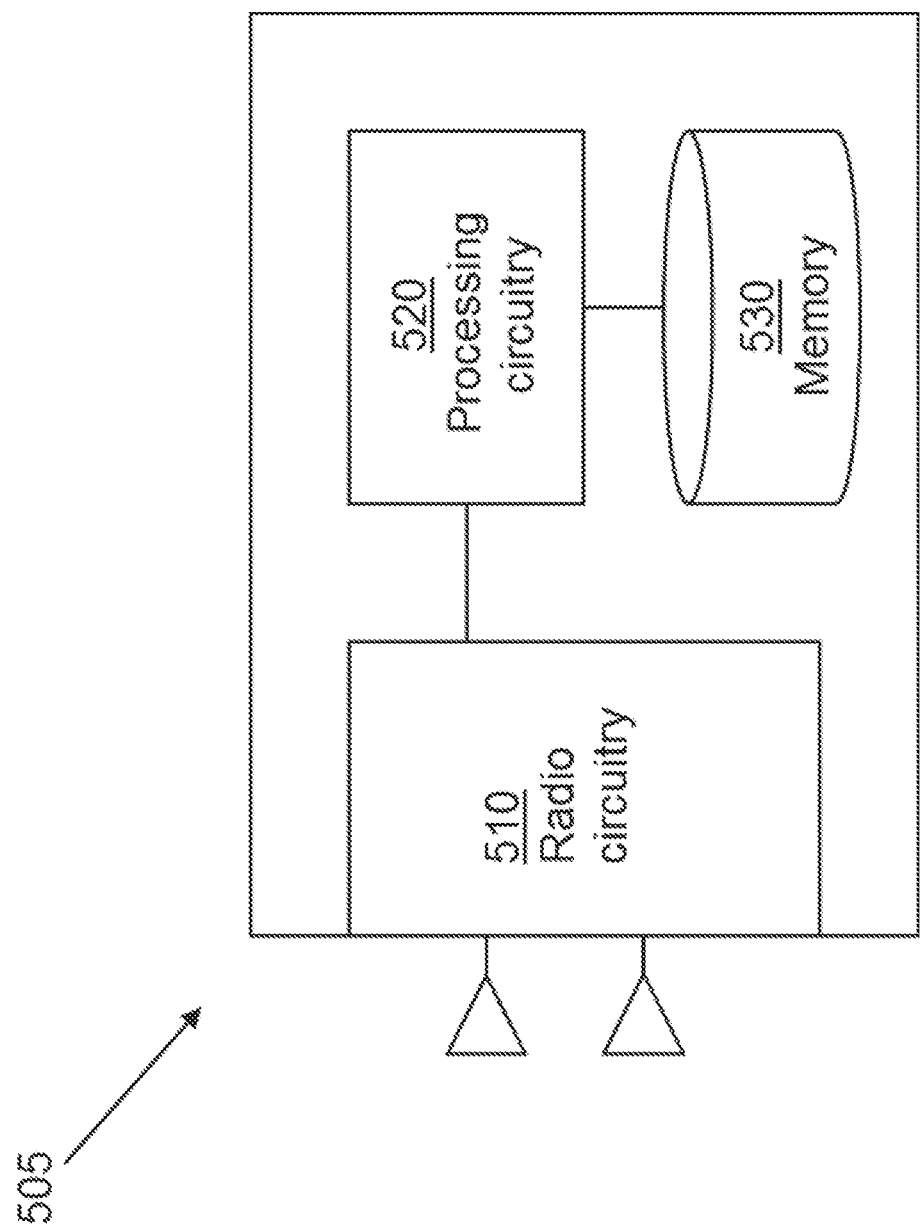
FIG. 16 is an example node configuration of a user equipment or wireless terminal, according to some of the example embodiments presented herein.

FIG. 16 illustrates an example node configuration of a wireless terminal or user equipment 501 which may perform some of the example embodiments described herein. The wireless terminal 501 may comprise radio circuitry or a communication port 510 that may be configured to receive and/or transmit communication data, instructions, and/or messages. It should be appreciated that the radio circuitry or communication port 510 may be comprised as any number of transceiving, receiving, and/or transmitting units or circuitry. It should further be appreciated that the radio circuitry or communication 510 may be in the form of any input or output communications port known in the art. The radio circuitry or communication 510 may comprise RF circuitry and baseband processing circuitry (not shown).

The wireless terminal 501 may also comprise a processing unit or circuitry 520 which may be configured to participate in message passing for messages related to a selective handover, or a handover of a sub-set of bearers associated with a user equipment. The processing circuitry 520 may be any suitable type of computation unit, for example, a microprocessor, digital signal processor (DSP), field programmable gate array (FPGA), or application specific integrated circuit (ASIC), or any other form of circuitry. The wireless terminal 501 may further comprise a memory unit or circuitry 530 which may be any suitable type of computer readable memory and may be of volatile and/or non-volatile type. The memory 530 may be configured to store received, transmitted, and/or measured data, device parameters, communication priorities, and/or executable program instructions.

Figure 17:
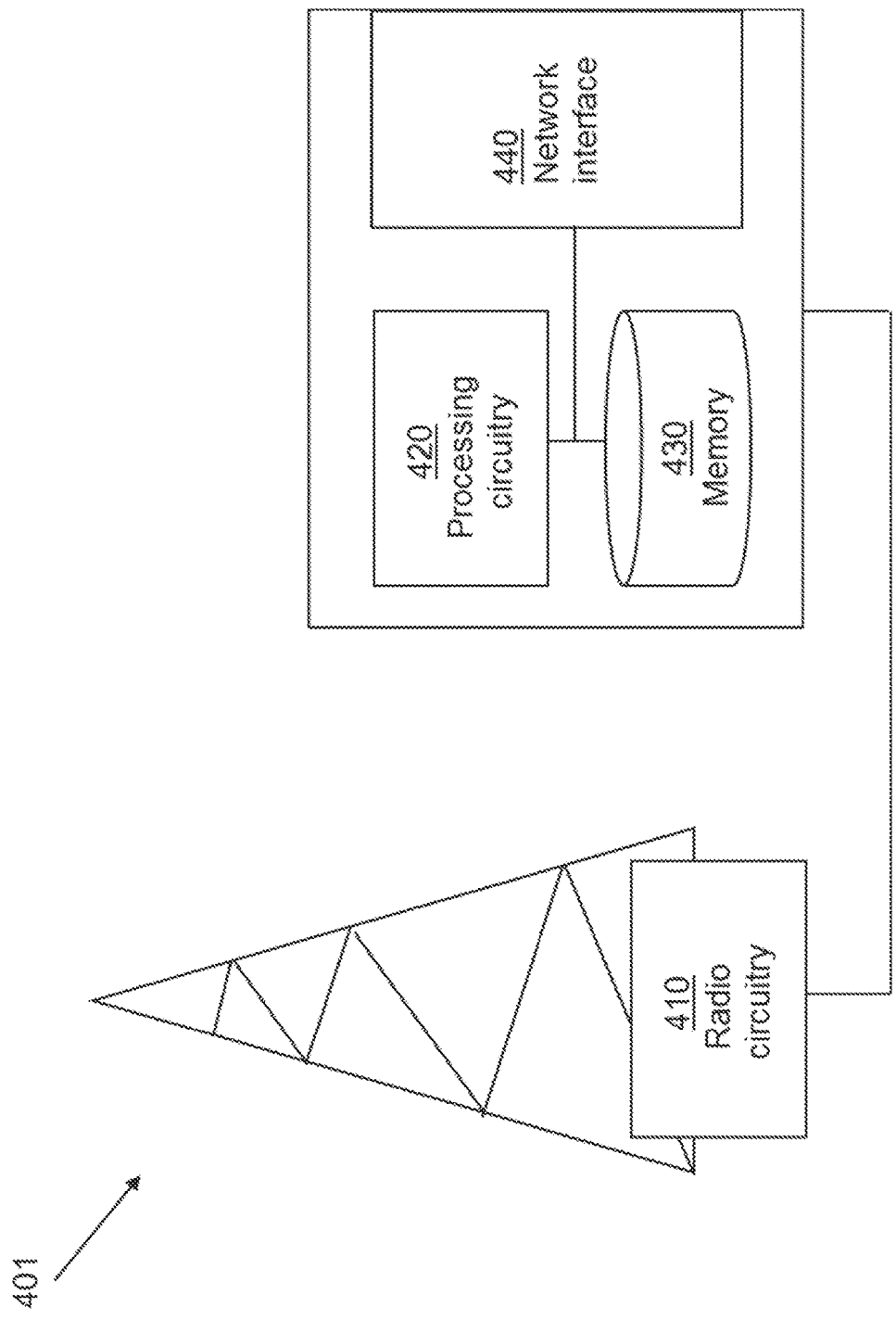
FIG. 17 is an example node configuration of a base station, according to some of the example embodiments presented herein.

FIG. 17 illustrates an example node configuration of a base station or eNB 401 which may perform some of the example embodiments described herein. It should be appreciated that the base station illustrated in FIG. 17 may be an anchor or assisting eNB. The base station 401 may comprise radio circuitry or a communication port 410 that may be configured to receive and/or transmit communication data, instructions, and/or messages. It should be appreciated that the radio circuitry or communication port 410 may be comprised as any number of transceiving, receiving, and/or transmitting units or circuitry. It should further be appreciated that the radio circuitry or communication 410 may be in the form of any input or output communications port known in the art. The radio circuitry or communication 410 may comprise RF circuitry and baseband processing circuitry (not shown).

The base station 401 may also comprise a processing unit or circuitry 420 which may be configured to provide a selective handover, or a handover of a sub-set of bearers associated with a user equipment. The processing circuitry 420 may be any suitable type of computation unit, for example, a microprocessor, digital signal processor (DSP), field programmable gate array (FPGA), or application specific integrated circuit (ASIC), or any other form of circuitry. The base station 401 may further comprise a memory unit or circuitry 430 which may be any suitable type of computer readable memory and may be of volatile and/or non-volatile type. The memory 430 may be configured to store received, transmitted, and/or measured data, device parameters, communication priorities, and/or executable program instructions.

Example Node Operations

Figure 18:
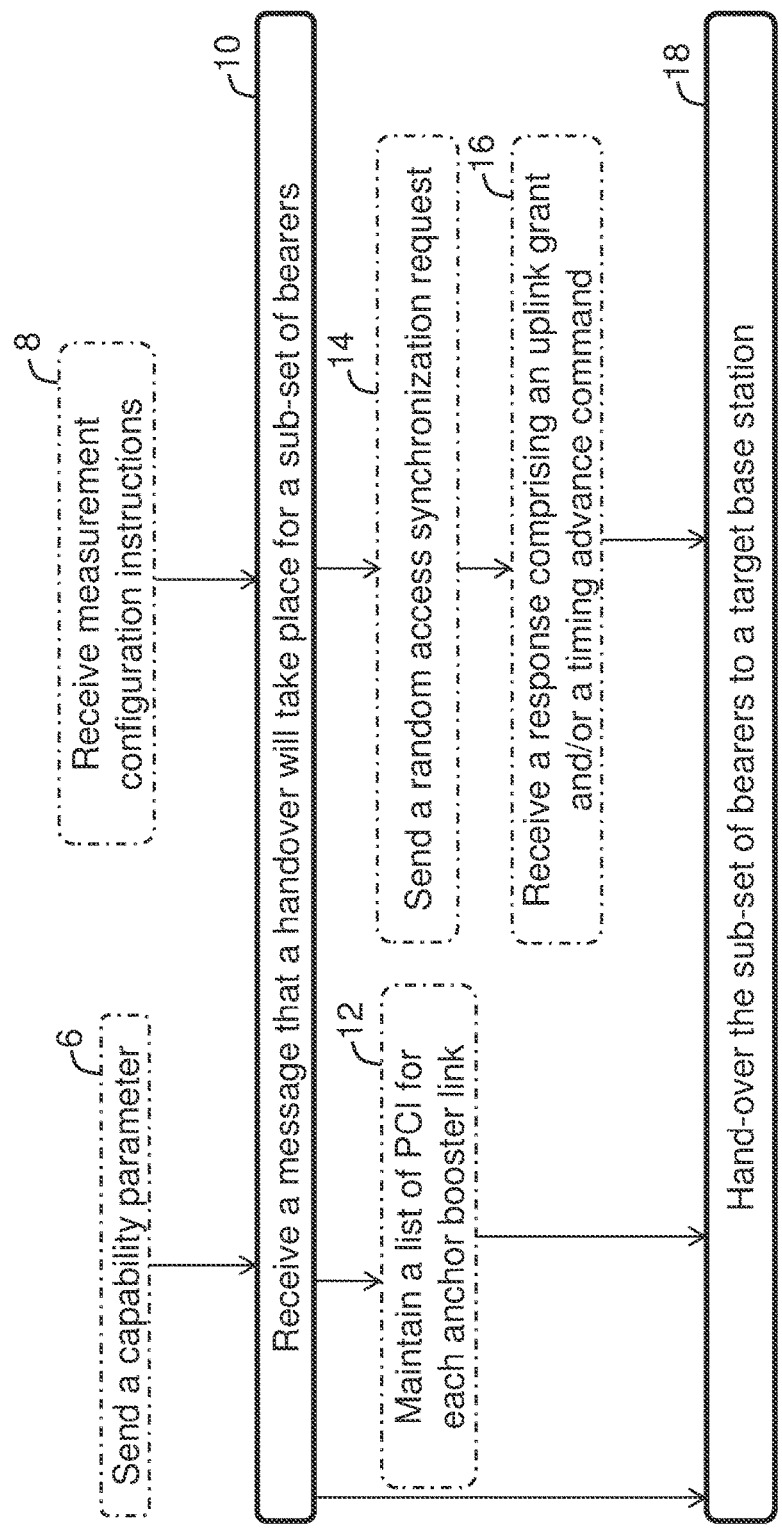
FIG. 18 is flow diagram depicting example operations of the user equipment or wireless terminal of FIG. 16, according to some of the example embodiments presented herein.

FIG. 18 is a flow diagram depicting example operations which may be taken by the wireless terminal 501 as described herein to undergo a selective handover, or a handover of a sub-set of bearers associated with the wireless terminal. It should be appreciated that FIG. 18 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Example Operation 6

According to some of the example embodiments, the wireless terminal may be configured to send 6, to a source or target base station, a capability parameter. The capability parameter provides an indication of whether or not the wireless terminal supports selective handover procedures. The radio circuitry 510 is configured to send the capability parameter to the source or target base station. Example operation 6 is described further under at least the subheadings 'Overview of selective handover' and 'Indication of selective handover'.

Example Operation 8

According to some of the example embodiments, the wireless terminal may be configured to receive 8, from the source or target base station, a plurality of configuration instructions for performing measurements. Each configuration instruction may correspond to at least a respective sub-set of cells monitored by the wireless terminal. The radio circuitry 510 is configured to receive, from the source or target base station, the plurality of configuration instructions for performing measurements.

According to some of the example embodiments, the plurality of configuration instructions comprises an identity of at least one serving cell associated with at least one respective configuration instruction. According to some of the example embodiments, the at least one configuration instruction comprises a triggering event. The triggering event indicates when a measurement associated with the at least one configuration instruction is to begin. Example operation 8 is described further under at least the subheading 'Measurement configurations'.

Operation 10

The wireless terminal is configured to receive 10, from the source or target base station, a message. The message indicates that a handover procedure will take place for an identified subset of bearers. The radio circuitry 510 is configured to receive, from the source or target base station, the message.

According to some of the example embodiments, the message may be a handover command or a RRC based message. Operation 10 is further described under at least subheadings 'Indication of a selective handover' and 'Subsequent selective handover'.

Example Operation 12

According to some of the example embodiments, the message may comprise at least one PCI identifying a cell in which at least one bearer of the identified subset of bearers will be handed over to. The wireless terminal may be further configured to maintain 12 a list of PCIs for each anchor and assisting link. The processing circuitry 520 may be configured to maintain the list of PCIs for each anchor and assisting link. Example operation 12 is described further under at least the subheadings 'Overview of the example embodiments', 'Measurement configuration', 'Bearer procedures' and 'Subsequent selective handover'.

Example Operation 14

According to some of the example embodiments, the wireless terminal is further configured to send 14, to the target or source base station, a random access synchronization request. The radio circuitry 510 is configured to send, to the target or source base station, a random access synchronization request. According to some of the example embodiments, the sending 14 may be the result of receiving a handover request for an empty (i.e., zero) subset of bearers. Example operation 14 is further described under at least the subheadings 'Overview of selective handover' and 'User equipment functionality during selective handover'.

Example Operation 16

According to some of the example embodiments, the sending 14 may further comprising receiving 16, from the target base station, a random access response comprising an uplink grant and/or timing advance command. The radio circuitry 510 is configured to receive, from the target base station, the random access response comprising the uplink grant and/or timing advance command. Example operation 16 is further described under at least the subheading 'User equipment functionality during selective handover'.

Operation 18

The wireless terminal is further configured to hand over 18 the identified subset of bearers to the target base station. At least one bearer associated with the wireless terminal, which is not part of the identified subset of bearers, remains connected to the source base station. Thus, the handover is a selective handover. The processing circuitry 520 is configured to hand over the identified subset of bearers to the target base station. Operation 18 is described further under at least the subheading 'Overview of the example embodiments'.

Figure 19:
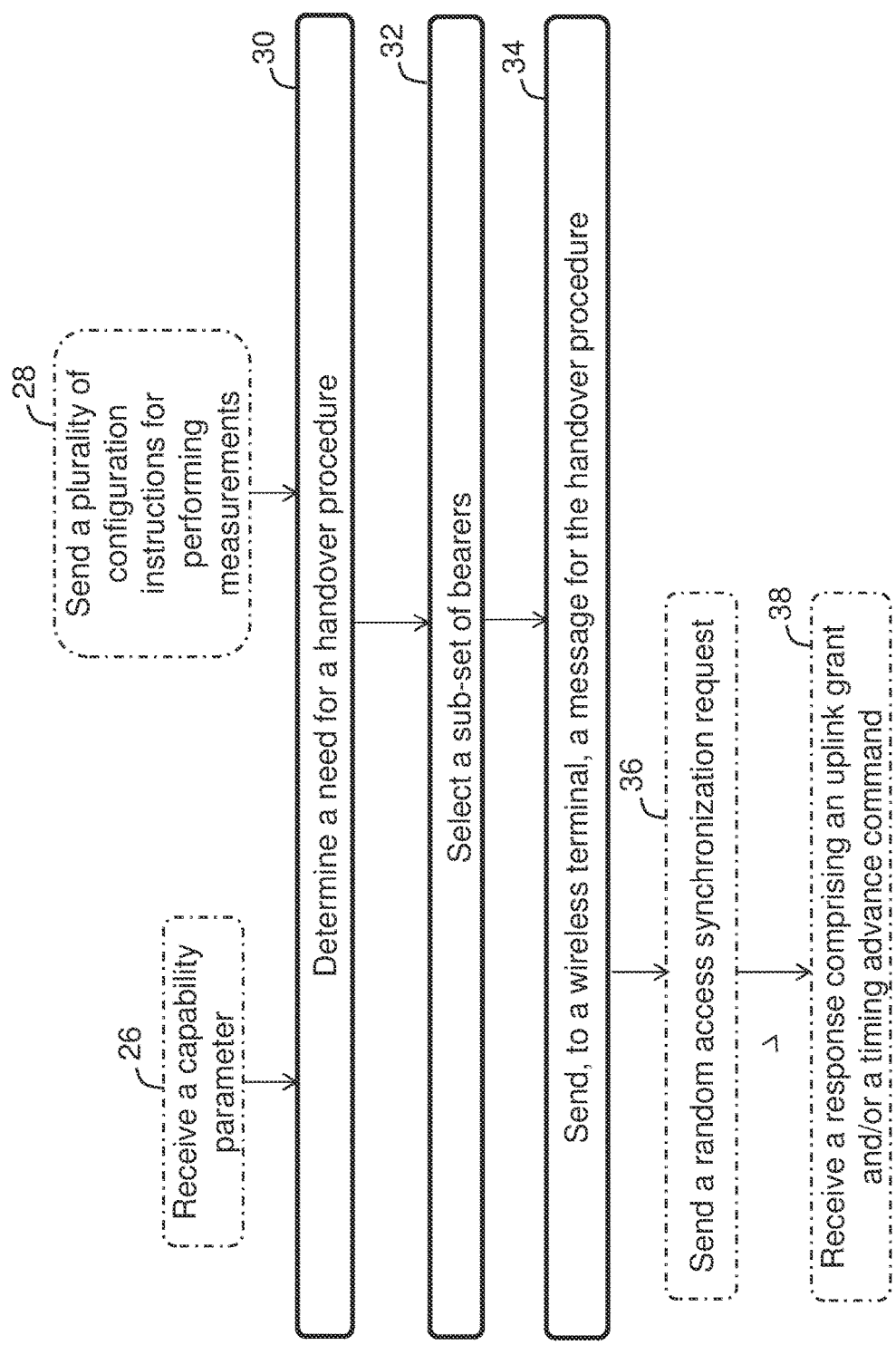
FIG. 19 is a flow diagram depicting example operations of the base station of FIG. 17, according to some of the example embodiments presented herein.

FIG. 19 is a flow diagram depicting example operations which may be taken by the base station 401 as described herein to provide a selective handover, or a handover of a sub-set of bearers associated with the wireless terminal. It should be appreciated that FIG. 19 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. It should further be appreciated that the example operations may be performed by either a source or target base station.

Example Operation 26

According to some of the example embodiments, the base station is configured to receive 26, from the wireless terminal, a capability parameter. The capability parameter provides an indication of whether or not the wireless terminal supports selective handover procedures. The radio circuitry 410 is configured to receive, from the wireless terminal, the capability parameter. Example operation 6 is described further under at least the subheadings 'Overview of selective handover' and 'Indication of selective handover'.

Example Operation 28

According to some of the example embodiments, the base station is further configured to send 28, to the wireless terminal, a plurality of configuration instructions for performing measurements. Each configuration instruction corresponds to at least a respective subset of cells monitored by the wireless terminal. The radio circuitry 410 is configured to send, to the wireless terminal, the plurality of configuration instructions for performing measurements.

According to some of the example embodiments, the plurality of configuration instructions comprises an identification of at least one serving cell associated with at least one respective configuration instruction. According to some of the example embodiments, the at least configuration instruction comprises a triggering event. The triggering event indicates when a measurement associated with a respective configuration instruction is to begin. Example operation 28 is described further under at least the subheading 'Measurement configurations'.

Operation 30

The base station is configured to determine 30 a need for a handover procedure. The processing circuitry 420 is configured to determine the need for the handover procedure. This determination may be made based on any number of factors, for example, a load situation of the source and/or target base station. Operation 30 is described further under at least the subheading 'Initiation of the handover'.

Example Operation 32

The base station 401 is further configured to select 32 the subset of bearers associated with the wireless terminal for the handover procedure. The processing circuitry is configured to select the subset of bearers associated with the wireless terminal for the handover procedure. According to some of the example embodiments, the subset of bearers may be an empty set of bearers, as described, for example, in relation to example operation 14. Operation 32 is described further under at least the subheadings 'Overview of selective handover' 'Selection of bearers to be handed over' and 'User equipment functionality during selective handover'.

Operation 34

The base station is further configured to send 34, to the wireless terminal, a message indicating a handover procedure for the subset of bearers. The radio circuitry 410 is configured to send, to the wireless terminal, the message indicating the handover procedure for the subset of bearers.

According to some of the example embodiments, the base station is a source base station or a target base station and the message is sent on behalf of the target base station. Operation 34 is further described under at least subheadings 'Initiation of the handover' and 'User equipment functionality during selective handover'.

Example Operation 36

According to some of the example embodiments, the base station may be further configured to receive 36, from the wireless terminal, a random access synchronization request. The radio circuitry 410 is configured to receive, from the wireless terminal, the random access synchronization request.

According to some of the example embodiments, the random access synchronization request may be received as a result of the wireless terminal receiving a handover request for an empty subset of bearers as described in relation to example operation 14. Example operation 36 is described further under at least the subheading 'User equipment functionality during selective handover'.

Example Operation 38

According to some of the example embodiments, the base station may be configured to send 38, to the wireless terminal, an uplink grant and/or a timing advance command. The radio circuitry 410 is configured to send, to the wireless terminal, the uplink grant and/or timing advance command. Example operation 38 is described further under at least the subheading 'User equipment functionality during selective handover'.

GENERAL STATEMENTS

It should be noted that although terminology from 3GPP LTE has been used herein to explain the example embodiments, this should not be seen as limiting the scope of the example embodiments to only the aforementioned system. Other wireless systems, comprising HSPA. WCDMA, WiMax, UMB, WiFi and GSM, may also benefit from the example embodiments disclosed herein. It should also be appreciated that the term bearer (pre-existing, primary or auxiliary) represents a Data Radio Bearer (DRB) and/or an EPS Radio Bearer.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices, wireless terminals or machine-to-machine devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method performed by a wireless terminal that is connected to a source radio base station via a plurality of radio bearers, the method comprising:
   receiving a message from a source base station or a target base station, indicating a selective handover of the wireless terminal from the source base station to the target base station; and
   performing the selective handover towards the target base station, in which fewer than all radio bearers in the plurality of radio bearers are handed over for connecting the wireless terminal to the target base station and connectivity between the wireless terminal and the source base station is maintained using one or more of the radio bearers not handed over to the target base station;
   wherein the message indicates that no radio bearers from the plurality of radio bearers are being handed over, and wherein performing the selective handover towards the target base station correspondingly comprises acquiring time alignment and synchronization with the target base station in preparation for a transfer of a later indicated subset of the radio bearers in the plurality of radio bearers to the target base station.

2. The method of claim 1, wherein a later transfer of the indicated subset of radio bearers includes the wireless terminal initializing a new protocol stack that corresponds with the target base station, for communicating with the target base station using the indicated subset of radio bearers.

3. The method of claim 1, wherein a later transfer of the indicated subset of radio bearers includes the wireless terminal performing radio resource control (RRC) reconfigurations for the indicated subset of radio bearers.

4. The method of claim 1, wherein a later transfer of the indicated subset of radio bearers includes the wireless terminal releasing, with respect to the indicated subset of radio bearers, associated Packet Data Convergence Protocol (PDCP) and Radio Link Control (RLC) entities from a protocol stack used by the wireless terminal for communicating with the source base station.

5. The method of claim 1, wherein, after a later transfer of the indicated subset of radio bearers to the target base station, the wireless terminal remains connected to the source base station via a remaining subset of radio bearers not transferred to the target base station.

6. A wireless terminal comprising:
   radio circuitry configured for communicating with base stations of a wireless communication network; and
   processing circuitry operatively associated with the radio circuitry and configured to:
      receive a message from a source base station or a target base station, indicating a selective handover of the wireless terminal from the source base station to the target base station; and
      perform the selective handover towards the target base station, in which fewer than all radio bearers in the plurality of radio bearers are handed over for connecting the wireless terminal to the target base station and connectivity between the wireless terminal and the source base station is maintained using one or more of the radio bearers not handed over to the target base station;
   wherein the message indicates that no radio bearers from the plurality of radio bearers are being handed over, and wherein the processing circuitry is configured to respond by acquiring time alignment and synchronization with the target base station in preparation for a transfer of a later indicated subset of the radio bearers in the plurality of radio bearers to the target base station.

7. The wireless terminal of claim 6, wherein, for a later transfer of the indicated subset of radio bearers, the processing circuitry is configured to initialize a new protocol stack that corresponds with the target base station, for communicating with the target base station using the indicated subset of radio bearers.

8. The wireless terminal of claim 6, wherein, for a later transfer of the indicated subset of radio bearers, the processing circuitry is configured to perform radio resource control (RRC) reconfigurations for the indicated subset of radio bearers.

9. The wireless terminal of claim 6, wherein, for a later transfer of the indicated subset of radio bearers, the processing circuitry is configured to release associated Packet Data Convergence Protocol (PDCP) and Radio Link Control (RLC) entities from a protocol stack used by the wireless terminal for communicating with the source base station.

* * * * *

UNITED STATES PATENT AND TRADEMARK OFFICE
CERTIFICATE OF CORRECTION

PATENT NO. : 11,778,524 B2
APPLICATION NO. : 17/381642
DATED : October 3, 2023
INVENTOR(S) : Teyeb et al.

It is certified that error appears in the above-identified patent and that said Letters Patent is hereby corrected as shown below:

In the Specification

In Column 1, Line 9, delete "2013," and insert -- 2013, now U.S. Pat. No. 11,140,587, --, therefor.

In Column 3, Line 57, delete "Symbol" and insert -- Signal --, therefor.

In Column 4, Line 2, delete "Connection" and insert -- Mobility --, therefor.

In Column 12, Line 34, delete "specific" and insert -- individual --, therefor.

In Column 13, Line 11, delete "one" and insert -- done --, therefor.

In Column 13, Lines 38-39, delete "nobilityControlInfo" and insert -- mobilityControlInfo --, therefor.

In Column 14, Line 28, delete "JE," and insert -- IE, --, therefor.

In Column 14, Line 40, delete "DCCH" and insert -- DTCH --, therefor.

In Column 14, Lines 45-46, delete "RRCConnectionRecon/igurationConmplete" and insert -- RRCConnectionReconfigurationComplete --, therefor.

In Column 16, Line 23, delete "between to" and insert -- between two --, therefor.

In Column 16, Line 25, delete "two the two" and insert -- the two --, therefor.

In Column 19, Line 7, delete "GUMMEI" and insert -- GUMMEI M --, therefor.

In Column 19, Line 23, delete "Infoirmation" and insert -- Information --, therefor.

In Column 19, Line 26, delete "CSG Membership Status" and insert -- CSG Membership Signed and Sealed this
Twenty-second Day of October, 2024

Katherine Kelly Vidal
*Director of the United States Patent and Trademark Office*

CERTIFICATE OF CORRECTION (continued)
U.S. Pat. No. 11,778,524 B2

Status O --, therefor.

In Column 20, Line 17, delete ""[i]f" and insert -- "if --, therefor.

In Column 20, Line 30, delete "JE" and insert -- IE --, therefor.

In Columns 20 & 21, in TABLE 1a, Line 1, delete "SWICTH" and insert -- SWITCH --, therefor.

In Columns 20 & 21, in TABLE 1a, Line 10, delete "ERABs>" and insert -- E-RABs> --, therefor.

In Column 21, Line 24, delete "JE" and insert -- IE --, therefor.

In Column 22, Line 59, delete "PDPC," and insert -- PDCP, --, therefor.

In Column 25, Line 32, delete "On" and insert -- One --, therefor.